(12) United States Patent
Blinder et al.

(10) Patent No.: US 12,437,060 B2
(45) Date of Patent: Oct. 7, 2025

(54) USING HIERARCHICAL REINFORCEMENT LEARNING (HRL) TO IDENTIFY APPLICATION PROGRAMMING INTERFACES (API) VULNERABILITIES

(71) Applicant: International Business Machines Corporation, Armonk, NY (US)

(72) Inventors: Oleg Blinder, Haifa (IL); Omer Yehuda Boehm, Haifa (IL); Micha Gideon Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 18/379,565

(22) Filed: Oct. 12, 2023

(65) Prior Publication Data

US 2025/0124125 A1 Apr. 17, 2025

(51) Int. Cl.
*G06F 21/55* (2013.01)
*G06F 9/54* (2006.01)

(52) U.S. Cl.
CPC ............ *G06F 21/552* (2013.01); *G06F 9/547* (2013.01)

(58) Field of Classification Search
None
See application file for complete search history.

(56) References Cited

U.S. PATENT DOCUMENTS

| 11,042,647 | B1 | 6/2021 | Joyce et al. |
| 2014/0237594 | A1 | 8/2014 | Thakadu et al. |
| 2016/0149937 | A1 | 5/2016 | Katmor et al. |
| 2018/0357413 | A1* | 12/2018 | Rivera ................... G06F 21/554 |
| 2019/0324795 | A1* | 10/2019 | Gao ....................... G06F 9/4843 |
| 2019/0378042 | A1 | 12/2019 | Tuzi et al. |
| 2020/0028873 | A1 | 1/2020 | Zhou |

(Continued)

FOREIGN PATENT DOCUMENTS

| CN | 109886021 A | 6/2019 |
| CN | 110008703 A | 7/2019 |

(Continued)

OTHER PUBLICATIONS

Ghanem et al., "Reinforcement Learning for Efficient Network Penetration Testing," Information, vol. 11, 2020, pp. 22 pages.

(Continued)

*Primary Examiner* — Syed A Roni
(74) *Attorney, Agent, or Firm* — Zilka-Kotab, P.C.

(57) ABSTRACT

A computer-implemented method, according to various approaches, includes causing a predetermined HRL agent to perform, in a controlled environment, execution of a first potentially malicious API call against a predetermined API. Performing execution of the first potentially malicious API call against the predetermined API includes: causing a first sub-agent of a first stage of an architecture of the HRL agent to make a first selection for defining a first portion of a first API call. Performing execution of the first potentially malicious API call against the predetermined API furthermore includes causing a second sub-agent of a second stage of the architecture of the HRL agent to make a second selection for defining a second portion of the first API call, and issuing the first API call to the predetermined API. First reward-based feedback is provided to the first sub-agent and the second sub-agent.

20 Claims, 12 Drawing Sheets

(56) References Cited

U.S. PATENT DOCUMENTS

| | | | |
|---|---|---|---|
| 2020/0364580 A1* | 11/2020 | Shang | G06N 3/006 |
| 2021/0081837 A1 | 3/2021 | Polleri et al. | |
| 2021/0377307 A1 | 12/2021 | Santana De Oliveira et al. | |
| 2022/0247643 A1 | 8/2022 | Dechene et al. | |

FOREIGN PATENT DOCUMENTS

| | | |
|---|---|---|
| EP | 3958152 A1 | 2/2022 |
| TW | 201633205 A | 9/2016 |
| TW | 201937394 A | 9/2019 |
| TW | 202522271 A | 6/2025 |
| WO | 2025/078890 A1 | 4/2025 |

OTHER PUBLICATIONS

Github, "CyberBattleSim," GitHub, Apr. 8, 2021, 9 pages, retrieved from https://github.com/microsoft/CyberBattleSim.

Vinyals et al., "StarCraft II: A New Challenge for Reinforcement Learning," arXiv, 2017, 20 pages, retrieved from https://browse.arxiv.org/pdf/1708.04782.pdf.

Wikipedia, "Penetration test," Wikipedia, 2023, 9 pages, retrieved from https://en.wikipedia.org/wiki/Penetration_test.

Berner et al., "Dota 2 with Large Scale Deep Reinforcement Learning," arXiv, 2019, 66 pages, retrieved from https://browse.arxiv.org/pdf/1912.06680.pdf.

Ye et al., "Mastering Complex Control in MOBA Games with Deep Reinforcement Learning," The Thirty-Fourth AAAI Conference on Artificial Intelligence (AAAI-20), 2020, pp. 6672-6679.

Hutsebaut-Buysse et al., "Hierarchical Reinforcement Learning: A Survey and Open Research Challenges," Machine Learning and Knowledge Extraction, vol. 4, 2022, pp. 172-221.

Postman, "Tools," Postman, Inc., 6 pages, retrieved from https://www.postman.com/product/tools/, 2023.

Gaba, I., "Step-by-Step Guide to Perform JMeter API Testing," simplilearn, Jul. 24, 2023, 12 pages, retrieved from https://www.simplilearn.com/tutorials/jmeter-tutorial/jmeter-api-testing.

Google, "Manage APIs with unmatched scale, security, and performance," Google Cloud, Apigee API Management, 14 pages, retrieved from https://cloud.google.com/apigee unknown.

Rest-Assured, "REST-assured," 2023, 4 pages, retrieved from https://rest-assured.io/.

OWASP, "Explore the world of cyber security," OWASP, 2023, 3 pages, retrieved from https://owasp.org/.

OWASP, "What is crAPI?" OWASP, 2023, 2 pages, retrieved from https://owasp.org/www-project-crapi/.

OWASP, "OWASP API Security Project," OWASP, 2023, 3 pages, retrieved from https://owasp.org/www-project-api-security/.

Hengst, B., "Hierarchical Reinforcement Learning," Encyclopedia of Machine Learning, 2011, pp. 495-502, retrieved from https://link.springer.com/referenceworkentry/10.1007/978-0-387-30164-8_363 22 pages.

Stone, P., "Reinforcement Learning," Encyclopedia of Machine Learning, 2011, pp. 849-851, retrieved from https://link.springer.com/referenceworkentry/10.1007/978-0-387-30164-8_714, 58 pages.

Ghanem Mohamed Chahine: "Towards an efficient automation of network penetration testing using model-based reinforcement learning", PhD thesis, Aug. 31, 2022, 209 pages, XP093216180, Retrieved from the Internet: URL: https://openaccess.city.ac.uk/id/eprint/29885/1/Ghanem%20Thesis%202023%20PDF-A.pdf.

International Searching Authority, "Notification of Transmittal of the International Search Report and the Written Opinion of the International Searching Authority, or Declaration," Patent Cooperation Treaty Nov. 8, 2024, 17 pages, International Application No. PCT/ IB2024/058639.

* cited by examiner

USING HIERARCHICAL REINFORCEMENT LEARNING (HRL) TO IDENTIFY APPLICATION PROGRAMMING INTERFACES (API) VULNERABILITIES

BACKGROUND

The present invention relates to application programming interfaces (APIs), and more specifically, this invention relates to identifying API vulnerabilities.

APIs are a fundamental element in application-driven environments. These APIs are important for modern mobile, software as a service (SaaS), and web applications across various industries, such as retail, transportation, and banking. Furthermore, APIs are used in both customer-facing and internal applications, such as the internet of things (IoT), autonomous vehicles, and smart cities. APIs provide developers with relatively powerful interfaces to the services an organization has to offer. Ensuring that APIs conform to published specifications and are resilient to potentially malicious input is critical to an organization's overall security.

APIs act as an intermediary between machines, and typically involves clients, servers, and resources. For context, "resources" can be any content or data that the server can provide to the client, e.g., a text file, a video, etc. Resources may include sensitive data such as personally identifiable information (PII), financial information, business-related valuable data, etc., and therefore, such resources are typically the targets of attackers. The importance of securing APIs has led to previous developments of API testing tools.

SUMMARY

A computer-implemented method, according to various approaches, includes causing a predetermined hierarchical reinforcement learning (HRL) agent to perform, in a controlled environment, execution of a first potentially malicious API call against a predetermined API. Performing execution of the first potentially malicious API call against the predetermined API includes: causing a first sub-agent of a first stage of an architecture of the HRL agent to make a first selection for defining a first portion of a first API call. Performing execution of the first potentially malicious API call against the predetermined API furthermore includes causing a second sub-agent of a second stage of the architecture of the HRL agent to make a second selection for defining a second portion of the first API call, and issuing the first API call to the predetermined API. First reward-based feedback is provided to the first sub-agent and the second sub-agent.

A computer program product, according to various approaches, includes a computer readable storage medium having program instructions embodied therewith. The program instructions are readable and/or executable by a computer to cause the computer to perform any combination of features of the foregoing methodology.

A system, according to various approaches, includes a processor, and logic integrated with the processor, executable by the processor, or integrated with and executable by the processor. The logic is configured to perform any combination of features of the foregoing methodology.

Other aspects and approaches of the present invention will become apparent from the following detailed description, which, when taken in conjunction with the drawings, illustrate by way of example the principles of the invention.

DETAILED DESCRIPTION

Figure 1:
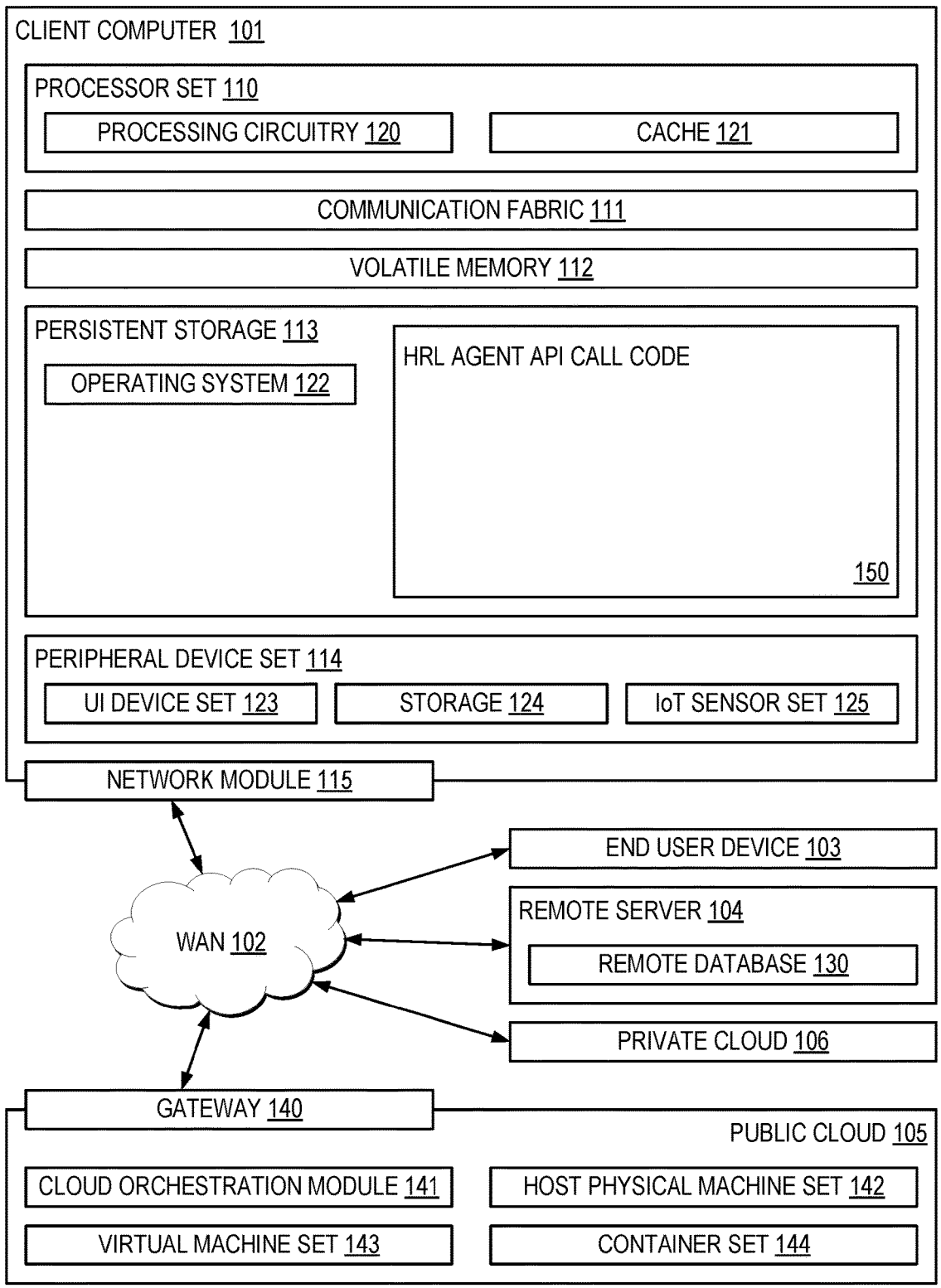
FIG. 1 is a diagram of a computing environment, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for using HRL to identify API vulnerabilities.

In one general approach, a computer-implemented method includes causing a predetermined HRL agent to perform, in a controlled environment, execution of a first potentially malicious API call against a predetermined API. Performing execution of the first potentially malicious API call against the predetermined API includes: causing a first sub-agent of a first stage of an architecture of the HRL agent to make a first selection for defining a first portion of a first API call. Performing execution of the first potentially malicious API call against the predetermined API furthermore includes causing a second sub-agent of a second stage of the architecture of the HRL agent to make a second selection for defining a second portion of the first API call, and issuing the first API call to the predetermined API. First reward-based feedback is provided to the first sub-agent and the second sub-agent.

A primary benefit of defining the portions of the API call is being able to perform a malicious attack on the predetermined API in order to determine, while the API is in the controlled environment, whether the predetermined API will be vulnerable to actual malicious attacks upon the predetermined API being launched in a public use case environment. Because the controlled environment is not accessible to actual malicious actors, any successful malicious attacks upon the predetermined API in the controlled environment do not pose an actual threat to the predetermined API. Furthermore, the reward-based feedback provided to the sub-agents of the stages of the architecture of the HRL agent that participated in making selections, provides the sub-agents of the HRL agent with feedback of the selections made. This enables the refinement of selections of the sub-agents in subsequent iterations. The method allows the HRL agent to train in a trial-and-error manner, learning from positive rewards and errors to perform with relatively better accuracies in iterations thereafter. This significantly improves action sampling efficiency in order to improve the efficiency of training the agent of the HRL agent.

The first stage of the architecture of the HRL agent may include a plurality of sub-agents, where the first portion of the first API call defines a selected method for a first micro-service to call in. Selection of a method for a first micro-service to call in diversifies the API call that is executed against the predetermined API to test whether the predetermined API can safely be launched in the public use case environment.

The second stage of the architecture of the HRL agent may include a plurality of sub-agents, where the second portion of the first API call defines a selected parameter to call for the selected method. Selection of a parameter to call for the selected method further diversifies the API call that is executed against the predetermined API to test whether the predetermined API can safely be launched in the public use case environment.

Performing execution of the first potentially malicious API call against the predetermined API may include: causing a third sub-agent of a third stage of the architecture of the HRL agent to make a third selection for defining a third portion of the first API call. The third stage of the architecture of the HRL agent includes a plurality of sub-agents, where the third portion of the first API call defines the first micro-service from a plurality of potential micro-services. Selection of a microservice from the plurality of microservices further diversifies the API call that is executed against the predetermined API to test whether the predetermined API can safely be launched in the public use case environment.

The selected parameter may, in some approaches, include video-ids, tokens, user-ids, and vehicle-ids. These different types of parameters may be applied in different iterations of API calls that are issued to the predetermined API in order to diversify the API calls that the predetermined API is tested with. Diversifying the API calls in these iterations increases the likelihood of uncovering a vulnerability of the predetermined API before the predetermined API is launched in the public use case environment. This way, if such a vulnerability exists, the vulnerability may be mitigated before the predetermined API enters the public use case environment where the vulnerability would otherwise be able to be exploited by a malicious actor.

Each of the sub-agents of the second stage of the architecture of the HRL agent may be configured to define a single parameter from a plurality of different parameters. Definition of such parameters by the sub-agents allows the API call to be determined in order to test whether the predetermined API can safely be launched in the public use case environment.

The second sub-agent of the second stage of the architecture of the HRL agent may be configured to define more than one parameter from a plurality of different parameters. These approaches in which the sub-agents are shared among the different parameters relatively improve convergence and significantly accelerate the learning process of the agent of the predetermined HRL agent.

The method may furthermore include causing the predetermined HRL agent to simulate, in the controlled environment, execution of a plurality of potentially malicious API calls against the predetermined API, where the execution of the first potentially malicious API call against the predetermined API includes Monte-Carlo simulations. These iterations of API calls enable the refinement of selections of the sub-agents throughout the different iterations. The method allows the HRL agent to train in a trial-and-error manner, learning from positive rewards and errors to perform with relatively better accuracies in iterations thereafter. Furthermore, a benefit of using Monte-Carlo based algorithms as opposed to temporal difference (TD) based RL algorithms are that the Monte-Carlo based algorithms have been found during testing to be relatively significantly more stable, as they converge relatively significantly more steadily and relatively faster.

In another general approach, a computer program product includes a computer readable storage medium having program instructions embodied therewith. The program instructions are readable and/or executable by a computer to cause the computer to perform any combination of features of the foregoing methodology. Similar technical effects are obtained.

In another general approach, a system includes a processor, and logic integrated with the processor, executable by the processor, or integrated with and executable by the processor. The logic is configured to perform any combination of features of the foregoing methodology. Similar technical effects are obtained.

In some preferred approaches, a computer-implemented method includes causing a predetermined HRL agent to perform, in a controlled environment, execution of a first potentially malicious API call against a predetermined API. Performing execution of the first potentially malicious API call against the predetermined API includes: causing a first sub-agent of a first stage of an architecture of the HRL agent to make a first selection for defining a first portion of a first API call. The first stage of the architecture of the HRL agent includes a plurality of sub-agents, where the first portion of the first API call defines a selected method for a first micro-service to call in. Performing execution of the first potentially malicious API call against the predetermined API furthermore includes causing a second sub-agent of a second stage of the architecture of the HRL agent to make a second selection for defining a second portion of the first API call. The second stage of the architecture of the HRL agent includes a plurality of sub-agents, where the second portion of the first API call defines a selected parameter to call for the selected method. Performing execution of the first potentially malicious API call against the predetermined API additionally includes causing a third sub-agent of a third stage of the architecture of the HRL agent to make a third selection for defining a third portion of the first API call. The third stage of the architecture of the HRL agent includes a plurality of sub-agents, where the third portion of the first API call defines the first micro-service from a plurality of potential micro-services. The method furthermore includes issuing the first API call to the predetermined API. First reward-based feedback is provided to the first sub-agent, the second sub-agent, and the third sub-agent.

Defining the three portions of the API call enables performance of a malicious attack on the predetermined API in order to determine, while the API is in the controlled environment, whether the predetermined API will be vulnerable to actual malicious attacks upon the predetermined API being launched in a public use case environment. This way, the predetermined API is able to first be tested in a controlled environment that does not include outside malicious actors that would otherwise be able to maliciously exploit vulnerabilities of the predetermined API. Accordingly, testing iterations in the controlled environment protect functionality of the predetermined API, and preserve processing resources that would otherwise be expended recovering from malicious actors in the use case environment.

In another general approach, a computer-implemented method includes causing a predetermined HRL agent to perform, in a controlled environment, execution of a first potentially malicious API call against a predetermined API. In some use cases, the controlled environment in which a device performing the method operations has access to interact with the predetermined API using the series of API calls, but the controlled environment is otherwise a closed environment in that it is not publicly accessible to other devices. Performing execution of the first potentially malicious API call against the predetermined API includes: causing a first sub-agent of a first stage of an architecture of the HRL agent to make a first selection for defining a first portion of a first API call. Performing execution of the first potentially malicious API call against the predetermined API furthermore includes causing a second sub-agent of a second stage of the architecture of the HRL agent to make a second selection for defining a second portion of the first API call, and issuing the first API call to the predetermined API. First reward-based feedback is provided to the first sub-agent and the second sub-agent.

In the use cases described above, the predetermined API is able to be tested in a controlled environment before ever being launched in a public use case environment. Because the controlled environment is not accessible to actual malicious actors, any successful malicious attacks upon the predetermined API in the controlled environment do not pose an actual threat to the predetermined API. This testing thereby preserves processing resources that would otherwise be expended recovering from malicious actors in the use case environment in the event that such iterations of testing were not performed.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as HRL agent API call code of block 150 for using HRL to identify API vulnerabilities. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As mentioned elsewhere above, APIs are a fundamental element in application-driven environments. These APIs are important for modern mobile, software as a service (SaaS), and web applications across various industries, such as retail, transportation, and banking. Furthermore, APIs are used in both customer-facing and internal applications, such as the internet of things (IoT), autonomous vehicles, and smart cities. APIs provide developers with relatively powerful interfaces to the services an organization has to offer. Ensuring that APIs conform to published specifications and are resilient to potentially malicious input is critical to an organization's overall security.

APIs act as an intermediary between machines, and typically involves clients, servers, and resources. For context, "resources" can be any content or data that the server can provide to the client, e.g., a text file, a video, etc. Resources may include sensitive data such as personally identifiable information (PII), financial information, business-related valuable data, etc., and therefore, such resources are typically the targets of attackers.

The importance of securing APIs has led to previous developments of API testing tools. However, traditional dynamic application security testing (DAST) scanners cannot cover APIs completely, and instead cover only a relatively small portion of APIs. Specifically, conventional API testing tools fail to test more than such relatively small portions of APIs in environments in which an organization's front end does not interact with all API endpoints. This is because of the complexity of APIs. Each API implements a specification, exposing the functionality through several API functions or methods. Each API method may be (optionally) parametrized with a various number of parameters, each of a different type and valid domain. However, such a complexity presents a significant challenge for APIs test automation, especially for Machine Learning (ML) techniques, and therefore automated API testing tools that span this complexity do not exist.

Other API testing tools include penetration testing and manual testing, which are relatively expensive and furthermore, do not effectively scale between different APIs. These additional API testing tools furthermore suffer from known critical drawbacks in that they do not offer continuous and comprehensive feedback regarding an organization's holistic security posture. Accordingly, there is a longstanding need for an API testing tool that offers efficient, cost-effective, and comprehensive testing of the entirety of APIs.

In sharp contrast to the deficiencies of the conventional API testing tools described above, the approaches described herein include techniques for comprehensive and vulnerability detection and discovery in APIs before the APIs are deployed. Such a universal automated penetration testing is configured to be continually run, e.g., twenty-four hours a day, seven days a week, three hundred and sixty-five days each year, or according to a predefined schedule. These techniques leverage machine learning techniques, and namely reinforcement learning. This leveraging includes sequentially simulating actions that closely mimic realistic multi-step threat scenarios in order to determine whether one or more of the threat scenarios are detected and caught by a service's API security controls.

Figure 2A:
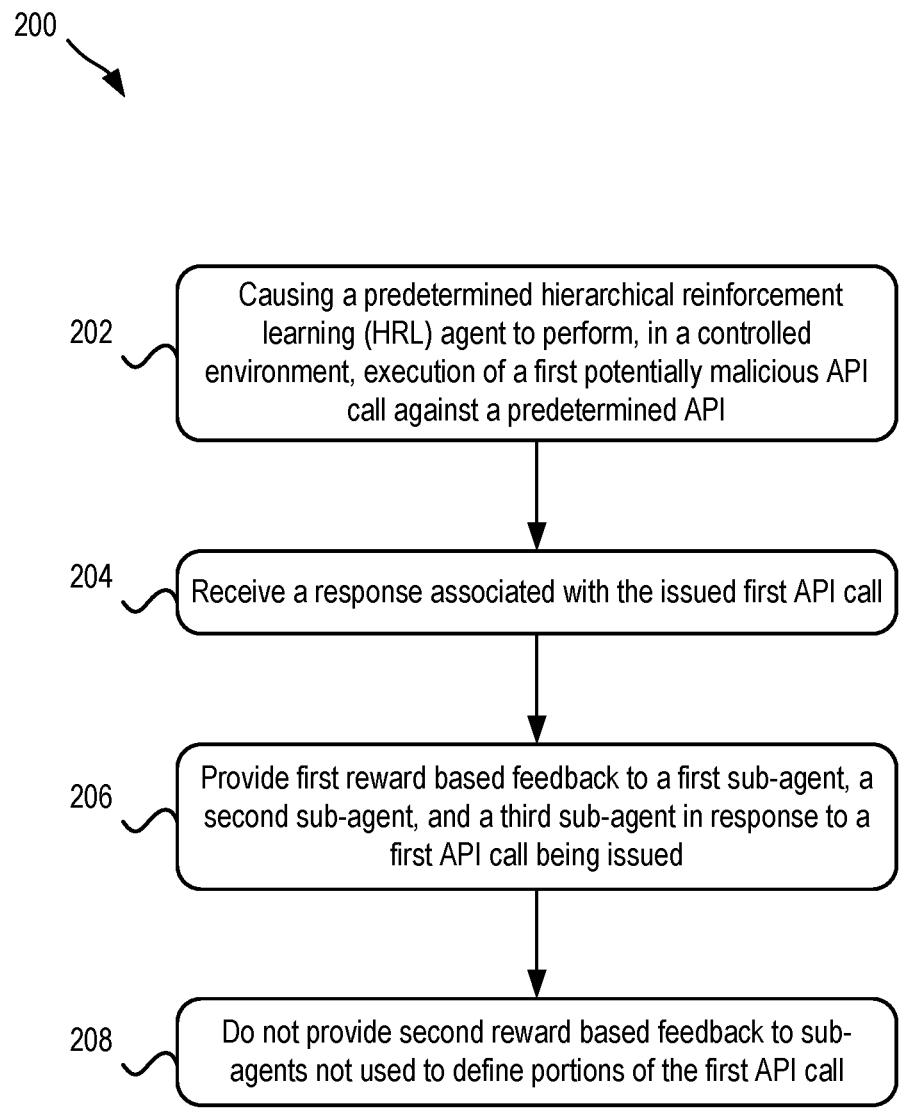
FIG. 2A is a flowchart of a method, in accordance with one approach of the present invention.

Now referring to FIG. 2A, a flowchart of a method 200 is shown according to one approach. The method 200 may be performed in accordance with the present invention in any of the environments depicted in FIGS. 1-9, among others, in various approaches. Of course, more or fewer operations than those specifically described in FIG. 2A may be included in method 200, as would be understood by one of skill in the art upon reading the present descriptions.

Each of the steps of the method 200 may be performed by any suitable component of the operating environment. For example, in various approaches, the method 200 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 200 includes techniques for leveraging HRL as a main technology for an API vulnerability testing, where an HRL agent composes an attack scenario, e.g., instructs a plurality of sub-agents of the HRL agent to define portions of an API call, in a controlled environment by creating a series of API calls mimicking attacker actions. As noted below, although various operations are described from the perspective of a first iteration of using sub-agents of the HRL agent to define portions of a first API call, in some preferred approaches, a plurality of such iterations are performed that are each based on at least some different portions. For context, the "controlled environment" may, in some approaches, be an environment in which a device performing operations of method 200 has access to interact with a predetermined API using the series of API calls. In some of such approaches, the controlled environment is a closed environment in that it is not publicly accessible. Furthermore, in some approaches, the API may be configured to selectively interact with web applications when deployed in a use case environment, e.g., a public environment, that is different than the controlled environment. In some preferred approaches, operations of method 200 are performed against the predetermined API in the controlled environment before the API is launched, according to a scheduled launch, in the use case environment. However, in some other use cases, various operations of method 200 may be performed, e.g., while the predetermined API is launched in the use case environment, during a scheduled downtime of the predetermined API, continually and ongoingly, etc.

It should further be prefaced that although various operations of method 200 described below are described from the operational perspective of a predetermined HRL agent performing, in the controlled environment, execution of a first potentially malicious API call against a predetermined API, e.g., a first iteration of an API call being executed, in some preferred approaches, the method 200 includes a plurality of such iterations of API calls being executed by the predetermined HRL agent.

Operation 202 includes causing a predetermined HRL agent to perform, in a controlled environment, e.g., private environment, execution of a first potentially malicious code, e.g., hereafter referred to as a "first API call", against a predetermined API. In other words, operation 202 includes executing real actions, and in doing so, closely mimicking, e.g., simulating, realistic multi-step threat scenarios while in a controlled environment. The execution of the first potentially malicious code against the predetermined API may be performed using two or more sub-agents of a plurality of different architecture stages of the HRL agent, e.g., see FIGS. 2B-2C.

Figure 2B:
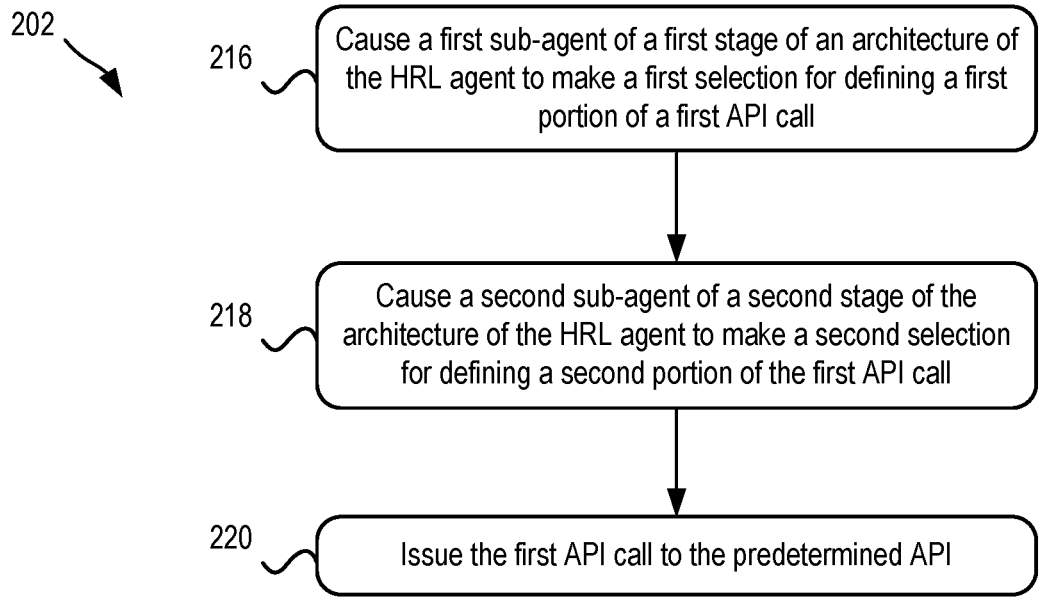
FIG. 2B is a flowchart of sub-operations of an operation of the flowchart of FIG. 2A, in accordance with one approach of the present invention.

Looking to FIG. 2B, exemplary sub-operations of performing the execution of the first potentially malicious code against the predetermined API are illustrated in accordance with one approach, one or more of which may be used to perform operation 202 of FIG. 2A. However, it should be noted that the sub-operations of FIG. 2B are illustrated in accordance with one approach which is in no way intended to limit the invention.

The flowchart of FIG. 2B includes sub-operations that are based on the use of two sub-agents of two different architecture stages of the HRL agent. The sub-agents of these stages are preferably caused, e.g., instructed, to make selections for defining an API call that is issued to the predetermined API call in order to perform, in the controlled environment, a malicious attack on the API. For example, sub-operation 216 includes causing a first sub-agent of a first stage of the architecture of the HRL agent to make a first selection for defining a first portion of a first API call. Web applications may be deployed as a collection of cooperative micro-services. Each application may implement an API specification, e.g., "contract", and expose a functionality of the application through a set of API functions or methods. Each method in turn can be optionally parametrized with one or more parameters, each of a different type and a valid domain. Accordingly, in some approaches, the first portion of the first API call preferably defines a selected method, e.g., function, for a first micro-service to call in. The selected method may be of a type that would become apparent to one of ordinary skill in the art after reading the descriptions herein, e.g., POST, PATCH, PUT, GET, DELETE, etc.

Figure 2C:
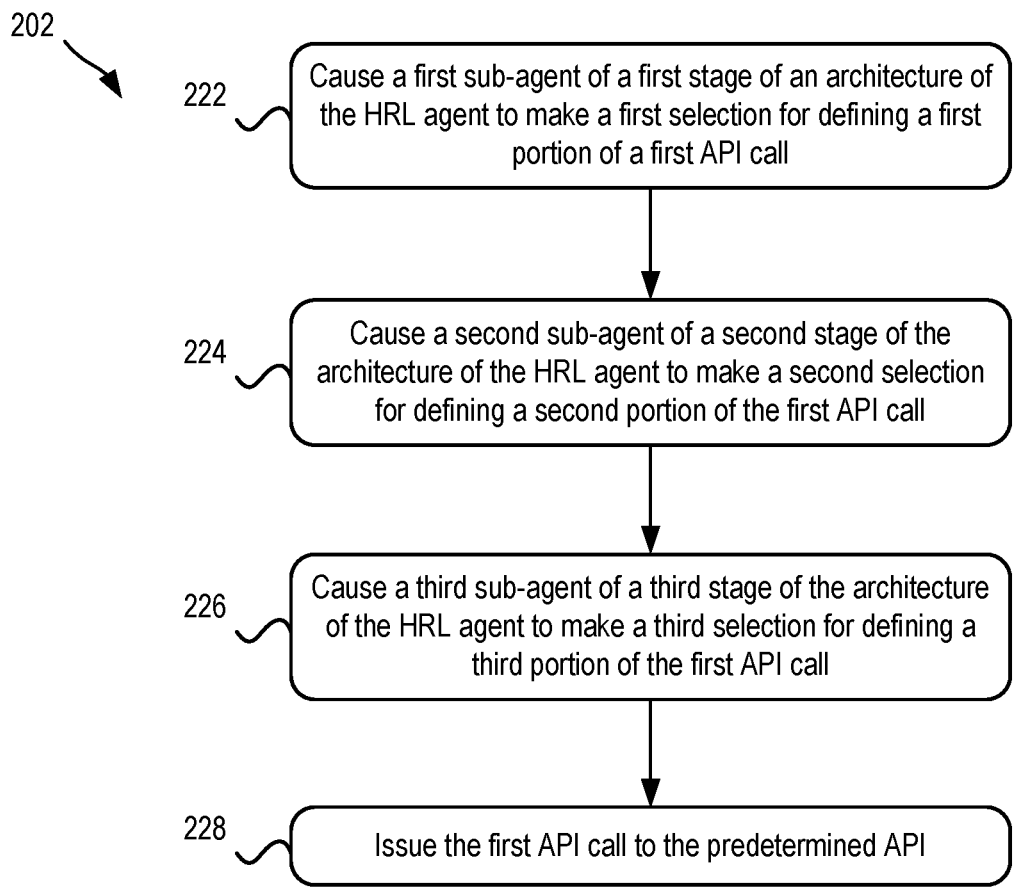
FIG. 2C is a flowchart of sub-operations of an operation of the flowchart of FIG. 2A, in accordance with one approach of the present invention.

It should be noted that in FIG. 2B, an assumption may be made that the performance of the HRL agent is based on a single micro-service, as opposed to causing a sub-agent to select one micro-service from a plurality of potential micro-services (described elsewhere herein in FIG. 2C). Meanwhile, the method may be selected from a plurality of potential methods. For example, in some approaches, the first stage of the architecture of the HRL agent may include a plurality of sub-agents configured to each define different first portions of the first API call and/or other API calls. This way, different API calls that are each based on a different first portion, e.g., a different selected method, may be generated in different iterations of execution of API calls against the predetermined API in order to diversify the API call that is executed against the predetermined API. Another benefit of defining the method of the API call, e.g., the first portion of the API call, is being able to simulate a malicious attack on the predetermined API in order to determine, while the API is in the controlled environment, whether the predetermined API will be vulnerable to actual malicious attacks upon the predetermined API being launched in a public use case environment.

Sub-operation 218 includes causing a second sub-agent of a second stage of the architecture of the HRL agent to make a second selection for defining a second portion of the first API call. The second portion of the first API call preferably defines a selected parameter to call for the selected method, e.g., the method selected by the first sub-agent of the first stage of the architecture of the HRL agent. The selected parameter may be of a type of parameter that would become apparent to one of ordinary skill in the art after reading the descriptions herein. For example, in some preferred approaches, the parameter is a type of identifier (id). For example, in one or more of such approaches, the parameter may include a video-id, a user-id, a vehicle-id, etc. Parameters may additionally and/or alternatively include tokens, in some approaches. In some other approaches, the parameters are values, e.g., arguments, to call for a previously selected method. It may be noted that, in some real-world applications, different HRL depths may be used, depending on the approach. For example, for relatively smaller scale monolith service testing, a two-stage HRL architecture may suffice, while for a relatively more complex cyber-system testing, three or more stages may be applied in order to provide adequate testing.

Different API calls that are each based on a different second portion, e.g., different selected parameter(s), may be generated in different iterations in order to diversify the second portion of the API call that is issued to the predetermined API. Another benefit of defining the parameter(s) of the API call, e.g., the second portion of the API call, is being able to simulate a malicious attack on the predetermined API in order to determine, while the API is in the controlled environment, whether the predetermined API will be vulnerable to actual malicious attacks upon the predetermined API being launched in a public use case environment.

The selection of the parameter may be made from a plurality of potential parameters. For example, the second stage of the architecture of the HRL agent, in some approaches, includes a plurality of sub-agents configured to each define different second portions of the first API call and/or other API calls.

In some approaches, each of the sub-agents of the second stage of the architecture of the HRL agent may be configured, e.g., assigned, to define a single parameter from a plurality of different parameters. In contrast, in some approaches, API methods may share common input parameters. In one or more of such approaches, some sub-agents of the second stage of the architecture of the HRL agent (that may be caused to make selection(s) for defining the second portion of an API call) may be shared among these methods. For example, in some approaches, the second sub-agent of the second stage of the architecture of the HRL agent may be configured, e.g., assigned, to define more than one parameter from a plurality of different parameters. These approaches in which the sub-agents are shared among the methods relatively improve convergence and significantly accelerate the learning process of the agent of the predetermined HRL agent.

Sub-operation 220 includes issuing the first API call to the predetermined API, e.g., submitted to the predetermined API for executing. Techniques that would become apparent to one of ordinary skill in the art after reading the descriptions herein may be used for issuing the API call to the predetermined API. In some approaches, issuing the first API call to the predetermined API includes submitting the API call over to the environment for execution. In some approaches, the environment may be caused to translate the abstract selected method into a real one, and call in the real web (micro) service through the API call. In return, an observation and/or an optional reward may be determined and/or received, and caused to be returned back to the sub-agents that were caused to define portions of the issued API call, as will be described elsewhere below.

Although a first API call is described above to be generated and applied to the predetermined API, in some preferred approaches, method 200 includes generating a plurality of API calls, e.g., a second API call, a third API call, a fourth API call, etc., that are each based on at least one different selection, e.g., the first portions of two given API calls differ, the second portions of two given API calls differ, etc. Furthermore, although FIG. 2B includes sub-operations of two stages of the architecture of the HRL agent, in some approaches, the architecture of the HRL agent may include more than two stages. For example, looking to FIG. 2C, exemplary sub-operations of simulating the execution of the first potentially malicious code against the predetermined API are illustrated in accordance with one approach, one or more of which may be used to perform operation 202 of FIG. 2A. However, it should be noted that the sub-operations of FIG. 2C are illustrated in accordance with one approach which is in no way intended to limit the invention.

The flowchart of FIG. 2C includes sub-operations that are based on the use of three sub-agents of three different architecture stages of the HRL agent. The sub-agents of these stages are preferably caused, e.g., instructed, to make selections for defining the first API call that is issued to the predetermined API call in order to perform, in the controlled environment, a malicious attack on the API. For example, sub-operation 222 includes causing a first sub-agent of a first stage of the architecture of the HRL agent to make a first selection for defining a first portion of a first API call. In some approaches, the first portion of the first API call preferably defines a first micro-service from a plurality of potential micro-services, e.g., a plurality of potential micro-service selections.

The first stage of the architecture of the HRL agent, in some approaches, includes a plurality of sub-agents configured to each define different first portions of the first API call. For example, in one or more of such approaches, the sub-agents may each be configured to select a different one of the micro-services. This way, different API calls that are each based on a different first portion, e.g., a different selected micro-service, may be generated in different iterations in order to diversify the first portion of the API call that is issued to the predetermined API. Another benefit of defining the micro-service of the API call, e.g., the first portion of the API call, is being able to simulate a malicious attack on the predetermined API in order to determine, while the API is in the controlled environment, whether the predetermined API will be vulnerable to actual malicious attacks upon the predetermined API being launched in a public use case environment.

Sub-operation 224 includes causing a second sub-agent of a second stage of the architecture of the HRL agent to make a second selection for defining a second portion of the first API call. In some approaches, the second portion of the first API call preferably defines a selected method, e.g., function, for the first micro-service to call in. The selected method may be of a type that would become apparent to one of ordinary skill in the art after reading the descriptions herein, e.g., POST, PATCH, PUT, GET, DELETE, etc.

Sub-operation 226 includes causing a third sub-agent of a third stage of the architecture of the HRL agent to make a third selection for defining a third portion of the first API call. The third portion of the first API call preferably defines a selected parameter to call for the selected method, e.g., the method selected by the second sub-agent of the second stage of the architecture of the HRL agent.

Sub-operation 228 includes issuing the first API call to the predetermined API. Techniques for submitting an API call to a predetermined API that would become apparent to one of ordinary skill in the art after reading the descriptions herein may be used.

It should be noted that although the architecture of the HRL agent is described to include two stages in FIG. 2B, and is described to include three stages in FIG. 2C, the architecture of the HRL agent may include more than three stages in some approaches. For example, in some approaches, the architecture includes a fourth stage, and a fourth sub-agent of the fourth stage may be caused to select a server that the selected micro-service is associated with, e.g., a sub-agent of the second layer is caused to select one of the micro-services of a plurality of micro-services of the selected server.

Referring again to FIG. 2A, with the first API call defined and issued to the predetermined API, in some approaches, a response associated with the issued first API call may be received from the predetermined API, e.g., see operation 204. In some approaches, the information may be information that is requested by the first API call, e.g., information that is requested based on the selections of the first API call. In some other approaches, the information may additionally and/or alternatively include observations about functional behavior the predetermined API as a result of the first API call being issued to the predetermined API. The receipt of the information may, in some approaches, beneficially be used to determine whether the first API call successfully identifies a vulnerability of the predetermined API. In other words, in some approaches, as a result of predetermined types of information being received from the predetermined API as a response to issuing the first API call to the predetermined API, at least some infrastructure and/or logic of the predetermined API that returns the information may be determined to be vulnerable to attackers, e.g., vulnerable in the event that the predetermined API is deployed in a use case environment. However, because performance of execution of the first potentially malicious API call against the predetermined API may be static, this response is optional and may, in some approaches, be received after additional iterations of API calls being issued to the predetermined API.

Reward-based feedback may be provided to one or more of the sub-agents of the stages of the architecture of the HRL agent in order to provide the sub-agents of the HRL agent with feedback, and more specifically, refine selections of the sub-agents in subsequent iterations, e.g., see operation 206. However, it should be noted that providing sub-agents of the HRL agent with such reward-based feedback is, in some approaches, an optional operation. In some approaches, the reward-based feedback is generated based on the received information. For example, in some approaches, in response to a determination that the first API call results in information being received, reward-based feedback may be provided to one or more of the sub-agents that were caused to generate portions of the first API call. In contrast, in response to a determination that the first API call does not result in information being received and/or nominal information being received, e.g., an error or null message, reward-based feedback may not be provided to one or more of the sub-agents that were caused to generate portions of the first API call.

In some approaches in which reward-based feedback is provided to sub-agents that make selections that define a portion of an issued API call, a timing in which the reward-based feedback is provided to the sub-agents may depend on the approach. For example, in some approaches, reward-based feedback is provided to one or more of the sub-agents upon a plurality of API calls being issued. In other words, at the end of a scheme that includes a plurality of API calls being issued to a predetermined API, only the sub-agents that were used to make selections that define portions of the API calls are provided reward based-feedback. In contrast, in some other approaches, one or more of the sub-agents that make such selections may be provided reward-based feedback toward the end of an associated iteration, e.g., subsequent to and/or in response to the API call being issued to the predetermined API. It should be noted that this optional reward-based feedback is preferably only provided to the sub-agents that are caused to define the portions of the API call. For example, operation 208 of method 200 includes not providing reward-based feedback to sub-agents not used to define portions of the first API call in a given iteration of method 200. In some preferred approaches, an observation is included in the optional reward-based feedback that is generated and returned back to the sub-agents.

According to one illustrative approach, in the flowchart of sub-operations of FIG. 2B, in some approaches, in order to train the sub-agents, method 200 includes providing first reward-based feedback to the first sub-agent and the second sub-agent in response to the first API call being issued to the predetermined API. Furthermore, in some of such approaches, method 200 may additionally and/or alternatively include not providing reward-based feedback to other sub-agent(s) of the first stage of the architecture in response to the other sub-agent(s) of the first stage of the architecture not being caused to define the first portion of the first API call, and not providing reward-based feedback to other sub-agent(s) of the second stage of the architecture in response to the other sub-agent(s) of the second stage of the architecture not being caused to define the second portion of the first API call. Accordingly, the reward-based feedback is only provided to agents that are used to make selections for defining portions of the first API call. In contrast, other sub-agents of these stages of the architecture of the HRL agent are not provided a reward-based on the other sub-agents of these stages not being used to define portions of the first API call. In the flowchart of sub-operations of FIG. 2C, the first sub-agent of the first stage of the architecture of the HRL agent, the second sub-agent of the second stage of the architecture of the HRL agent, and the third sub-agent of the third stage of the architecture of the HRL agent may be provided a reward for generating portions of the first API call, in order to train the sub-agents. In contrast, other sub-agents of these stages of the architecture of the HRL agent are not provided a reward-based on the other sub-agents of these stages not being used to define portions of the first API call.

In some approaches, only a final "goal" reward is provided to sub-agents at the end of the scenario, e.g., upon the response being received. While TD based RL algorithms (where the sub-agent(s) learn after each step) may be applied in some approaches, other algorithms may be alternatively applied in order to reach convergence. For example, in some approaches, N-step TD, TD($\lambda$) with eligibility traces may be used, while in some other approaches, Monte-Carlo based algorithms may be applied in method 200 while performing the execution of the first potentially malicious API call against the predetermined API (e.g., where the sub-agent(s) learn after several steps or even at the end of the iteration). More specifically, in some of such approaches, method 200 may include causing the predetermined HRL agent to perform, in the controlled environment, execution of a plurality of potentially malicious API calls against the predetermined API, and at least some of the iterations may be Monte-Carlo simulations. For example, in these Monte-Carlo simulations, training of the agent (including all the participating sub-agents that made selections during the iteration) is performed at the end of the whole scenario, e.g., all iterations are completed, taking in account all the (optional) rewards received on the way. In contrast, in the TD training method, the agent (including all the participating sub-agents that made selections during the iteration) is trained at the end of each iteration where rewards have been received after execution of the iteration action.

A benefit of using Monte-Carlo based algorithms as opposed to TD based RL algorithms are that the Monte-Carlo based algorithms have been found during testing to be relatively significantly more stable, as they converge relatively significantly more steadily and faster. In fact, during testing it was observed in a majority of cases when the TD training method could not converge at all, while at the same time, in the same use-cases, the Monte-Carlo based algorithms were observed to efficiently converge. In some of such approaches, an RL agent may be applied such that each sub-agent deals solely with a relevant homogeneous subset of the entire action space, and presumably each sub-agent may consume only a subset of the observation state. This way each sub-agent becomes significantly smaller (slimmer and shallower), thereby requiring fewer layers and parameters to be trained. This eventually results in relatively faster convergence and more efficient computing resources usage. It should be noted that these efficiencies and rate of convergence are not otherwise achievable using conventional API tools. This is because otherwise allowing agents to learn after each step of a process incorporates prior knowledge into training of the HRL agent which deteriorates convergence.

In response to a determination that the information associated with the issued first API call is not received as a result of running the first API call, the predetermined API may be caused to be deployed in a use case environment. The use case environment is preferably different than the controlled environment. For example, the use case environment may be a public environment that is accessible to threat actors, e.g., devices that maliciously attempt to obtain information from the API. As a result of, in some approaches, only causing the predetermined API to be deployed in the use case environment in response to a determination that the predetermined API does not include vulnerabilities identified in the controlled environment, the predetermined API is not corrupted by malicious actors. For example, private information of the API is not accessible to malicious devices as a result of the techniques described herein being implemented in the controlled environment before the predetermined API is deployed in the use case environment. This results in a reduction in computer processing operations being performed to deploy the first API, as recovery options that would otherwise have to be performed in order to recover from vulnerabilities of the predetermined API being exploited are ultimately avoided.

As mentioned elsewhere above, although various operations of method 200 described are described from the operational perspective of a predetermined HRL agent performing, in the controlled environment, execution of the first potentially malicious API call against a predetermined API, in some preferred approaches, the method 200 includes a plurality of such iterations of API calls being executed by the predetermined HRL agent. For example, in one or more of such approaches, at least some different sub-agents of the stages described above (and optionally some of the same sub-agents of the stages described above) may be caused to generate portions of additional iterations of API calls that are issued to the predetermined API, e.g., a second API call, a third API call, a fourth API call, etc. This way, the predetermined API is relatively thoroughly tested in the controlled environment until a determination is made that the predetermined API is ready to be deployed in the use case environment, and furthermore, the sub-agents of the predetermined HRL agent are refined by providing rewards to the different sub-agents used in each iteration of the method being performed.

In addition to the numerous performance benefits described elsewhere herein, the techniques described herein enable an HRL agent to train in a trial-and-error manner, learning from positive rewards and errors to perform with relatively better accuracies in iterations thereafter. This significantly improves action sampling efficiency in order to improve the efficiency of training the agent of the HRL agent. In the context of API vulnerability detection and discovery, these efficiencies and relative improvements are enabled by leveraging of HRL to handle heterogeneous state-dependent action space, enabling automatic problem decomposition into smaller HRL friendly sub-problems (stages of the architecture of the HRL agent) where each sub-problem is handled by an HRL sub-agent, and optional reward-based training of those HRL sub-agents. Each sub-agent deals solely with a relevant homogeneous state-independent subset of the entire action space and presumably may consume only a subset of the observation state. As a result, each sub-agent becomes relatively smaller (slimmer and shallower), relatively fewer layers and parameters are used to train the HRL agent, relatively faster convergence is achieved, and relatively more efficient computing resources usage is achieved.

This decomposition is particularly applicable to typical web application APIs which may have relatively complex structures. For example, some applications may be built as a monolith or as a set of cooperative micro-services (either physical or virtual), and each microservice may have a different set of methods. The methods differ in the number, the types and the domains of the parameters. While an environment may abstract away many of the API details, an HRL agent that is responsible for an attack scenario creation, may still have to adapt to a heterogeneous action space. To tackle such a challenge, the techniques described herein leverage the HRL concept, where a large problem is broken down into smaller sub-problems. In the context of API testing of a web service built of several micro-services, the HRL agent is broken down into policy learning HRL agents built over multiple hierarchical stages of the architecture of the HRL agent.

Figure 3:
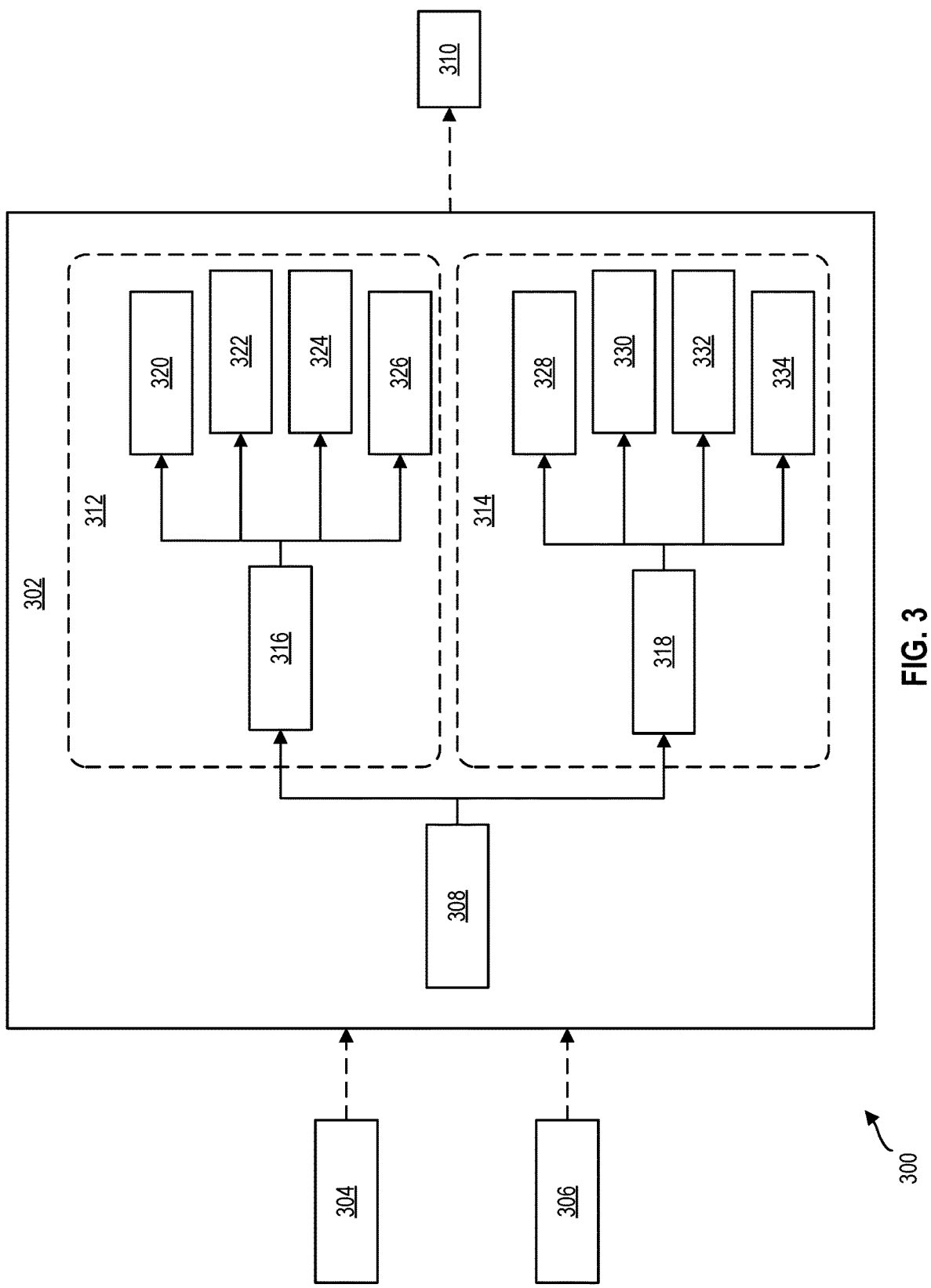
FIG. 3 is an architecture of an HRL agent, in accordance with one approach of the present invention.

FIG. 3 depicts an architecture 300 of an HRL agent, in accordance with one approach. As an option, the present architecture 300 may be implemented in conjunction with features from any other approach listed herein, such as those described with reference to the other FIGS. Of course, however, such architecture 300 and others presented herein may be used in various applications and/or in permutations which may or may not be specifically described in the illustrative approaches listed herein. Further, the architecture 300 presented herein may be used in any desired environment.

The architecture 300 includes an HRL agent structure 302 that is configured to be fed by an observation 304 which may include information, and an optional reward 306. The predetermined HRL agent may be caused to perform, in a controlled private environment, execution of one or more potentially malicious codes against a predetermined API that is scheduled to be released in a public environment. The execution of the API call during a first iteration may be enabled by creating a first API call 310 to execute on the predetermined API. In some approaches, performing execution of the first potentially malicious API call against the predetermined API includes causing a first sub-agent of a first stage of the architecture 300 of the HRL agent to make a first selection for defining a first portion of a first API call. For example, the first stage may include a first sub-agent 308. The first sub-agent 308 may, in some preferred approaches, be a micro-service director that is configured to select a micro-service for the first portion of the first API call.

In some approaches, performing execution of the first potentially malicious API call against the predetermined API includes causing a second sub-agent of a second stage of the architecture 300 of the HRL agent to make a second selection for defining a second portion of the first API call. In architecture 300, there are two different potential micro-service attacker portions, e.g., see first portion 312 and portion 314, that may be pursued after selection of the micro-service by the first sub-agent. For example, in the first portion 312, a first sub-agent 316 of the second stage of the architecture 300 of the HRL agent may be caused to make a selection for defining a second portion of the first API call, while in the second portion 314, a second sub-agent 318 of the second stage of the architecture 300 of the HRL agent may be caused to make a selection for defining the second portion of the first API call. In some approaches, the first sub-agent 316 of the second stage and the second sub-agent 318 of the second stage are a set of method dispatchers (one per micro-service), that each deal with a different method for a particular micro-service to call in.

The performance of executing the API call may, additionally and/or alternatively, include causing a sub-agent of a third stage of the architecture 300 of the HRL agent to make a third selection for defining a third portion of the first API call. In the first portion 312 a plurality of sub-agent of the third stage of the architecture 300 include sub-agent 320, sub-agent 322, sub-agent 324, and sub-agent 326, while in the second portion 314 a plurality of sub-agent of the third stage of the architecture 300 include sub-agent 328, sub-agent 330, sub-agent 332, and sub-agent 334. The sub-agents of the third stage of the architecture 300 may, in some approaches, be method parameter selectors (one per a micro-service method) that each choose parameter values to call with for the method previously selected in the second stage of the architecture 300.

The different possible selections of the different stages enable different API calls to be generated in different iterations in order to diversify the API call that is issued to the predetermined API. These different API calls thereby diversity the malicious attacks that are simulated on the predetermined API in order to determine, while the API is in the controlled environment, whether the predetermined API will be vulnerable to actual malicious attacks upon the predetermined API being launched in a public use case environment.

Figure 4:
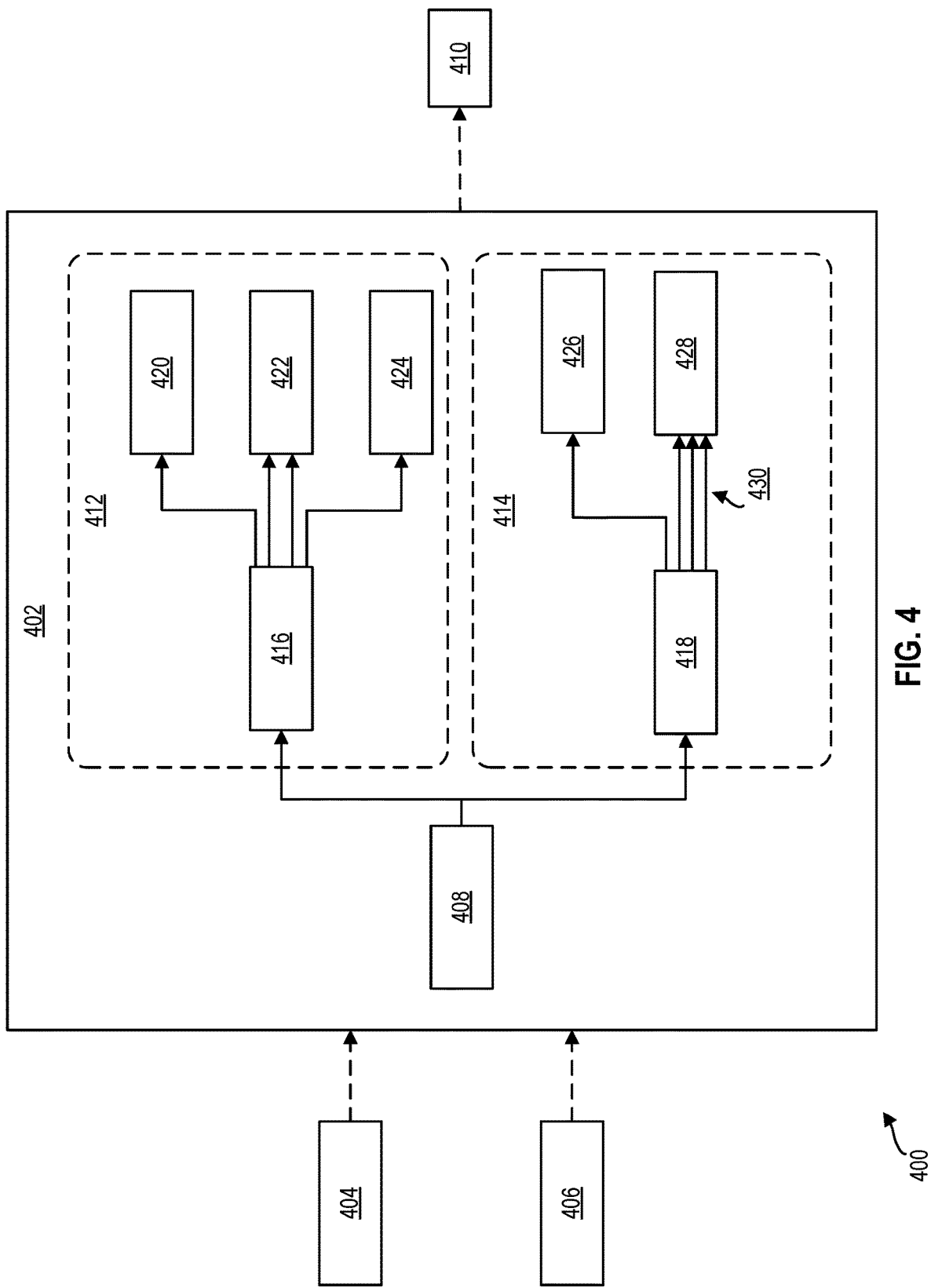
FIG. 4 is an architecture of an HRL agent, in accordance with one approach of the present invention.

FIG. 4 depicts an architecture 400 of an HRL agent, in accordance with one approach. As an option, the present architecture 400 may be implemented in conjunction with features from any other approach listed herein, such as those described with reference to the other FIGS. Of course, however, such architecture 400 and others presented herein may be used in various applications and/or in permutations which may or may not be specifically described in the illustrative approaches listed herein. Further, the architecture 400 presented herein may be used in any desired environment.

The architecture 400 includes an HRL agent structure 402 that is configured to be fed by an observation 404 which may include a response, and an optional reward 406. The predetermined HRL agent may be caused to perform, in a controlled private environment, execution of one or more potentially malicious codes against a predetermined API that is scheduled to be released in a public environment. The performance may be enabled by creating a first API call 410 to execute on the predetermined API. In some approaches, the performance includes causing a first sub-agent of a first stage of the architecture 400 of the HRL agent to make a first selection for defining a first portion of a first API call. For example, the first stage may include a first sub-agent 408. The first sub-agent 408 may, in some preferred approaches, be a micro-service director that is configured to select a micro-service for the first portion of the first API call.

In some approaches, the performance includes causing a second sub-agent of a second stage of the architecture 400 of the HRL agent to make a second selection for defining a second portion of the first API call. In architecture 400, there are two different potential micro-service attacker portions, e.g., see first portion 412 and portion 414, that may be pursued after selection of the micro-service by the first sub-agent. For example, in the first portion 412, a first sub-agent 416 of the second stage of the architecture 400 of the HRL agent may be caused to make a selection for defining a second portion of the first API call, while in the second portion 414, a second sub-agent 418 of the second stage of the architecture 400 of the HRL agent may be caused to make a selection for defining the second portion of the first API call. In some approaches, the first sub-agent 416 of the second stage and the second sub-agent 418 of the second stage are a set of method dispatchers (one per micro-service), that each deal with a different method for a particular micro-service to call in.

The performance may additionally and/or alternatively include causing a sub-agent of a third stage of the architecture 400 of the HRL agent to make a third selection for defining a third portion of the first API call. In the first portion 412 a plurality of sub-agent of the third stage of the architecture 400 include sub-agent 420, sub-agent 422, and sub-agent 424, while in the second portion 414 a plurality of sub-agent of the third stage of the architecture 400 include sub-agent 426, and sub-agent 428. The sub-agents of the third stage of the architecture 300 may, in some approaches, be method parameter selectors. However, in contrast to other sub-agents of the third stage that are each configured to a single different micro-service method, in some approaches, some API functions may share common input parameters. For example, sub-agent 428 is a parameter sub-agent of the third stage that is shared among a plurality of potential API functions, e.g., see potential API function selections 430, that may be selected by the second sub-agent 418 of the second stage of the architecture 400. Such an approach relatively improves utilization of computational resources, e.g., memory footprint, CPU power, GPU power, etc., relatively improves convergence and significantly accelerates the sub-agent's learning process.

The different possible selections of the different stages enable different API calls to be generated in different iterations in order to diversify the API call that is issued to the predetermined API. These different API calls thereby diversify the malicious attacks that are executed on the predetermined API in order to determine, while the API is in the controlled environment, whether the predetermined API will be vulnerable to actual malicious attacks upon the predetermined API being launched in a public use case environment.

Figure 5A:
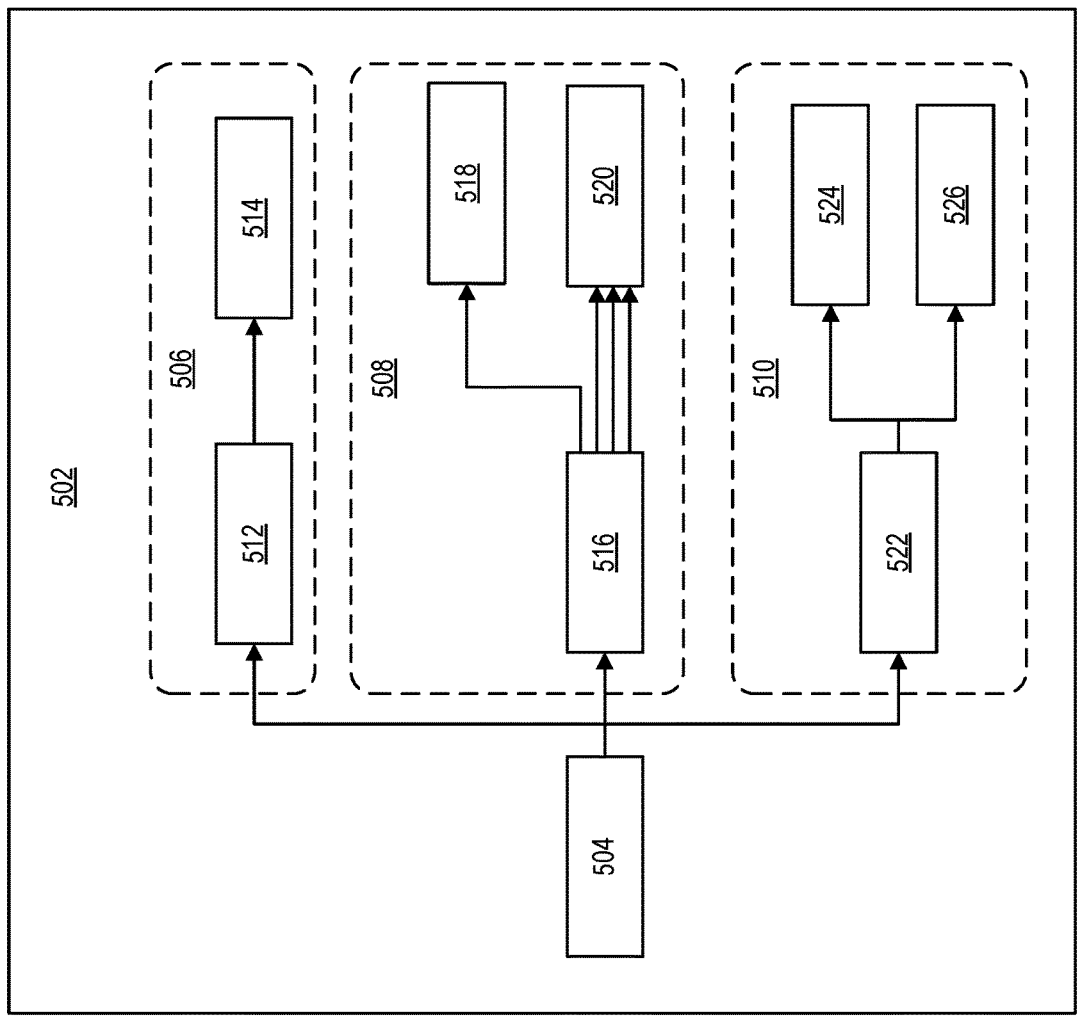
FIG. 5A is an architecture of an HRL agent, in accordance with one approach of the present invention.
Figure 5B:
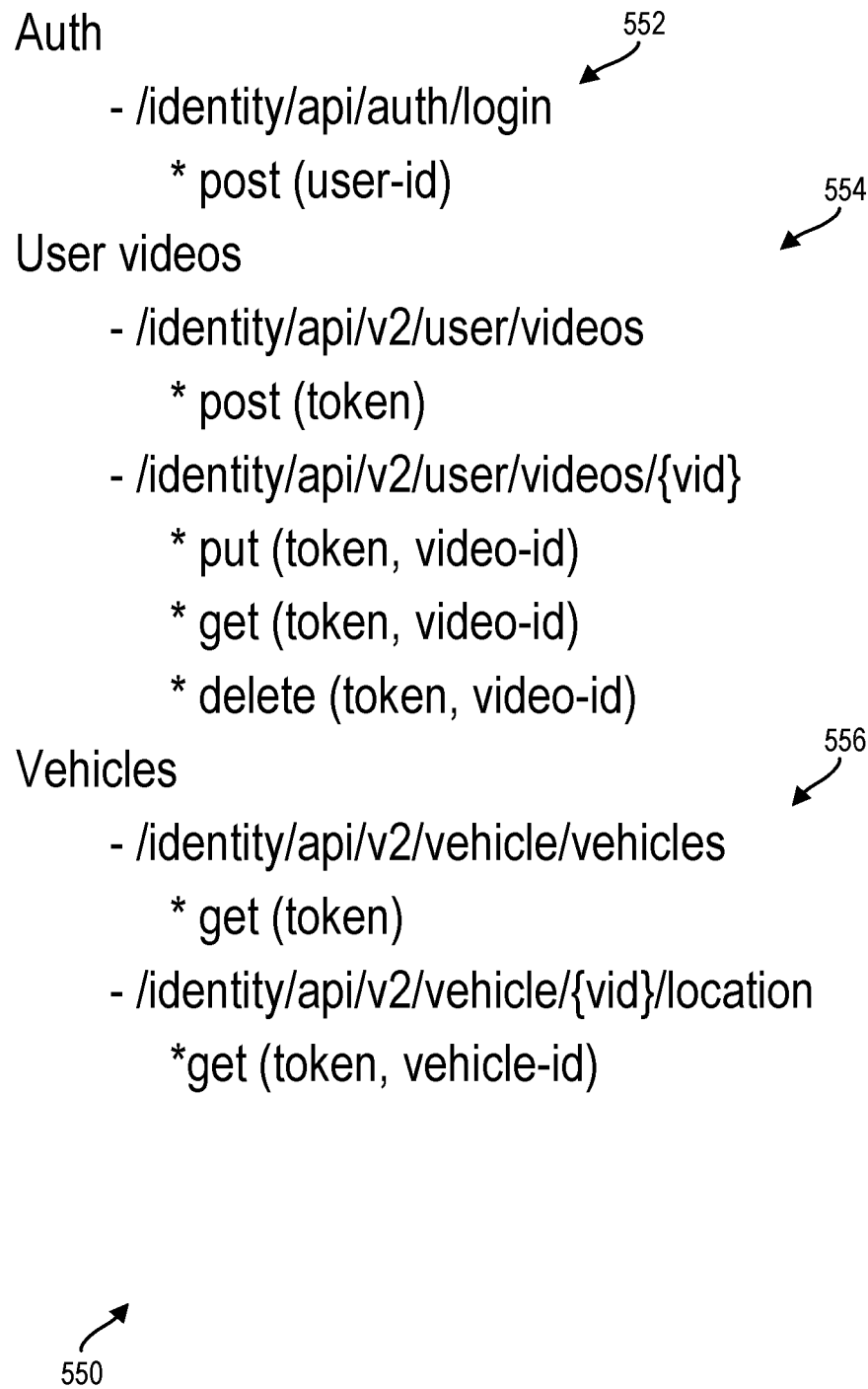
FIG. 5B is a sample of code generated by the architecture of FIG. 5A, in accordance with one approach of the present invention.

FIG. 5A depicts an architecture 500 of an HRL agent and FIG. 5B depicts code 550 of an API call generated by the architecture 500, in accordance with several approaches. As an option, the present architecture 500 and code 550 may be implemented in conjunction with features from any other approach listed herein, such as those described with reference to the other FIGS. Of course, however, such architecture 500 and code 550 and others presented herein may be used in various applications and/or in permutations which may or may not be specifically described in the illustrative approaches listed herein. Further, the architecture 500 and code 550 presented herein may be used in any desired environment.

Referring first to FIG. 5A, the architecture 500 includes an HRL agent structure 502. The predetermined HRL agent may be caused to perform, in a controlled private environment, execution of one or more potentially malicious codes against a predetermined API that is scheduled to be released in a public environment. The performance may be enabled by creating API call (see FIG. 5B) to execute on the predetermined API. In some approaches, the performance includes causing a first sub-agent of a first stage of the architecture 500 of the HRL agent to make a first selection for defining a first portion of a first API call. For example, the first stage may include a first sub-agent 504. The first sub-agent 504 may, in some preferred approaches, be a micro-service director that is configured to select a micro-service for the first portion of the first API call.

In some approaches, the performance includes causing a second sub-agent of a second stage of the architecture 500 of the HRL agent to make a second selection for defining a second portion of the first API call. In architecture 500, there are three different potential micro-service attacker portions, e.g., see first portion 506, second portion 508 and third portion 510, that may be pursued after selection of the micro-service by the first sub-agent. For example, in the first portion 506, a first sub-agent 512 of the second stage of the architecture 500 of the HRL agent may be caused to make a selection for defining a second portion of the first API call.

The second portion of the first API call may be an authentication method selector. A sub-agent of a third stage of the architecture 500 of the HRL agent may be caused to make a selection for defining a third portion of the first API call. For example, the sub-agent 514 may be a user-ID selector for defining a user-ID of the first API call.

For example, in the second portion 508, a second sub-agent 516 of the second stage of the architecture 500 of the HRL agent may be caused to make a selection for defining the second portion of the first API call. In some approaches, the second sub-agent 516 is a videos method selector. A sub-agent of the third stage of the architecture 500 of the HRL agent may be caused to make a selection for defining the third portion of the first API call. For example, the sub-agent 518 may be a token selector for defining a token of the first API call, and the sub-agent 520 may be a token and video-ID selector for defining a token and video-ID of the first API call.

In the third portion 510, a third sub-agent 522 of the second stage of the architecture 500 of the HRL agent may be caused to make a selection for defining a third portion of the first API call that is based on user vehicles. In some approaches, the third sub-agent 522 is a vehicles method selector. A sub-agent of the third stage of the architecture 500 of the HRL agent may be caused to make a selection for defining the third portion of the first API call. For example, the sub-agent 524 may be a token selector for defining a token of the first API call, and the sub-agent 526 may be a token and vehicle-ID selector for defining a token and vehicle-ID of the first API call.

The different possible selections of the different stages enable different API calls to be generated in different iterations of generating and issuing API calls in order to diversify the API call that is issued to the predetermined API. These different API calls thereby diversify the malicious attacks that are simulated on the predetermined API in order to determine, while the API is in the controlled environment, whether the predetermined API will be vulnerable to actual malicious attacks upon the predetermined API being launched in a public use case environment.

Referring now to FIG. 5B, the code 550 may be at least a portion of the API call generated by the architecture 500 of FIG. 5A. For example, the code 550 includes a first portion 552 that is defined by sub-agents of the architecture 500, a second portion 554 that is defined by other sub-agents of the architecture 500, and a third portion 556 that is defined by other sub-agents of the architecture 500.

With joint reference now to FIGS. 5A-5B, it should be noted that, in some preferred approaches, only sub-agents that have contributed to the first API call, e.g., made selections define portions of the first API call, are trained with the corresponding reward during each iteration. In one or more of such approaches, this may include, the sub-agent of the first stage, e.g., the micro-service director, that selects a micro-service "S" to apply to, a sub-agent of the second stage that is a corresponding method dispatcher that is caused to choose a method "M" to call in, and a sub-agent of the third stage that is an appropriate method parameters selector that is caused to select parameters "P". In such an example, only these three specific sub-agents are trained in each iteration and enjoy from the reward that has been returned to the HRL Agent as a result of the corresponding call, e.g., as a result of issuing the first API call to a predetermined API. The architecture 500 may be caused to perform automatic vulnerability detection and discovery in predetermined APIs. Such universal automated penetration testing can be continually run on guard, e.g., twenty-four hours a day, seven days a week, three hundred and sixty-five days each year, or according to a predefined schedule, in order to prevent vulnerabilities of the predetermined API from being exploited in use case environments. Accordingly, the techniques described herein provide a generic solution to API complexity involving heterogeneous state-dependent action space, significantly accelerate agent training and improve convergence, and relatively effectively utilize computing resources during the agent training.

Figure 6:
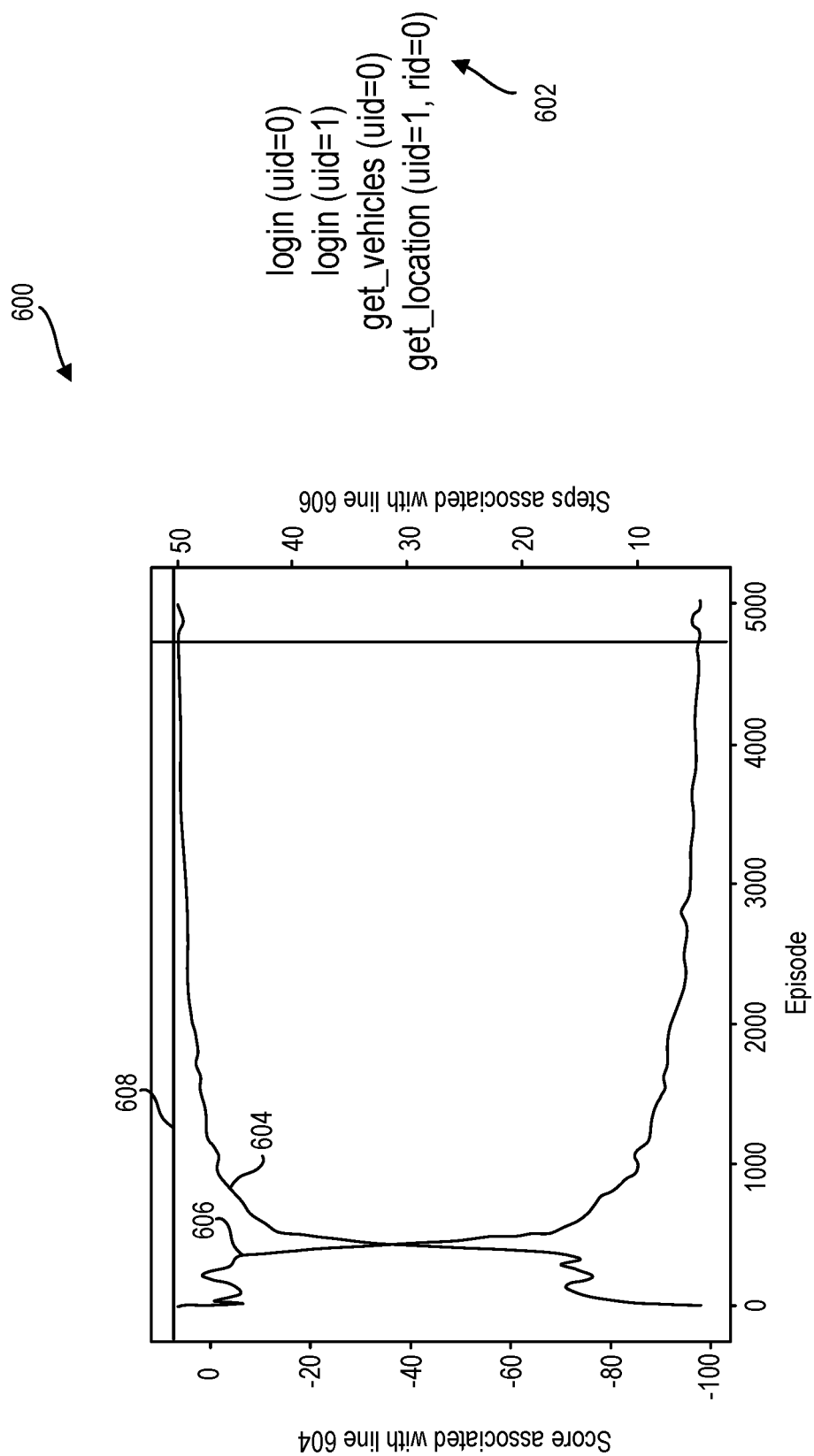
FIG. 6 is a graph, in accordance with one approach of the present invention.

FIG. 6 depicts a graph 600, in accordance with one approach. As an option, the present graph 600 may be implemented in conjunction with features from any other approach listed herein, such as those described with reference to the other FIGS. Of course, however, such graph 600 and others presented herein may be used in various applications and/or in permutations which may or may not be specifically described in the illustrative approaches listed herein. Further, the graph 600 presented herein may be used in any desired environment.

The graph 600 illustrates a running average of one hundred previous scores and steps performed using an HRL agent to identify API vulnerabilities of a predetermined API. For example, this identification is performed by generating and issuing an API call to the predetermined API, e.g., see API call 602. An assumption may be made that, issuing different API calls over a plurality of iterations run to generate the data of the graph 600 simulates a three-stage reinforce (MC) RL attacker exploiting a broken object level authorization (BOLA) vulnerability of the predetermined API.

A first line 606 illustrates a number of steps, e.g., see "Steps associated with line 606" that are performed in order to perform the different iterations, e.g., see "Episode". It may be noted that as a result of implementing the techniques described herein for using HRL to identify API vulnerabilities, an accuracy of the HRL agent, e.g., see second line 604, quickly increases to a predetermined optimal policy score value 608, that is associated with a relatively high accuracy of identifying vulnerabilities in a given API, e.g., BOLA vulnerabilities in the current approach, in a relatively early stage of the iterations. As a result of identifying these vulnerabilities, the vulnerabilities may be ensured to be mitigated before the predetermined API is deployed in a use case environment.

Figure 7:
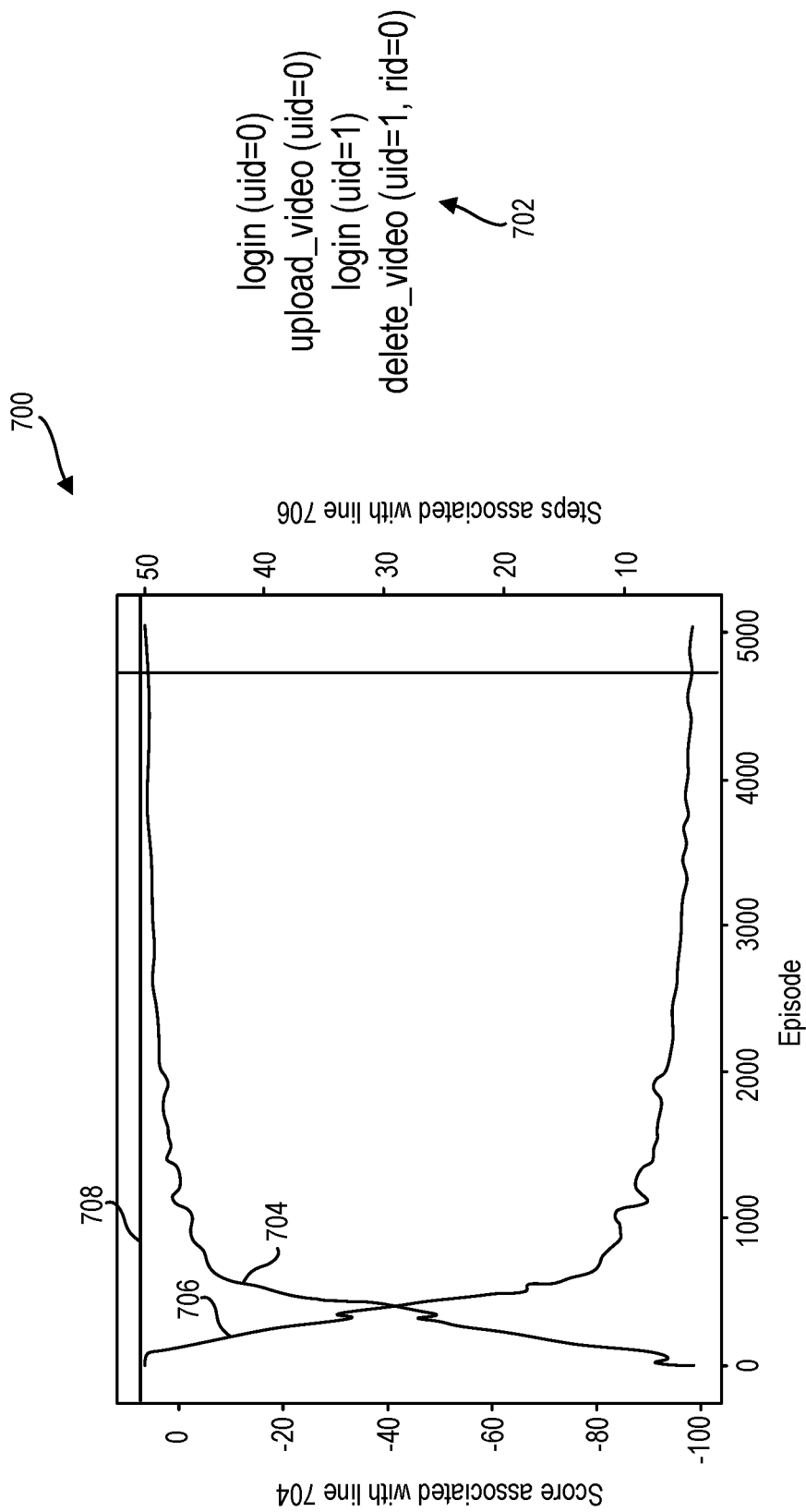
FIG. 7 is a graph, in accordance with one approach of the present invention.

FIG. 7 depicts a graph 700, in accordance with one approach. As an option, the present graph 700 may be implemented in conjunction with features from any other approach listed herein, such as those described with reference to the other FIGS. Of course, however, such graph 700 and others presented herein may be used in various applications and/or in permutations which may or may not be specifically described in the illustrative approaches listed herein. Further, the graph 700 presented herein may be used in any desired environment.

The graph 700 illustrates a running average of one hundred previous scores and steps performed using an HRL agent to identify API vulnerabilities of a predetermined API. For example, this identification is performed by generating and issuing an API call to the predetermined API, e.g., see API call 702. An assumption may be made that, issuing different API calls over a plurality of iterations run to generate the data of the graph 700 simulates a three-stage reinforce (MC) RL attacker exploiting a Broken Function Level Authorization (BFLA) vulnerability of the predetermined API.

A first line 706 illustrates a number of steps, e.g., see "Steps associated with line 706" that are performed in order to perform the different iterations, e.g., see "Episode". It may be noted that as a result of implementing the techniques described herein for using HRL to identify API vulnerabilities, an accuracy of the HRL agent, e.g., see second line 704, quickly increases to a predetermined optimal policy score value 708, that is associated with a relatively high accuracy of identifying vulnerabilities in a given API, e.g., BFLA vulnerabilities in the current approach, in a relatively early stage of the iterations. As a result of identifying these vulnerabilities, the vulnerabilities may be ensured to be mitigated before the predetermined API is deployed in a use case environment.

Figure 8:
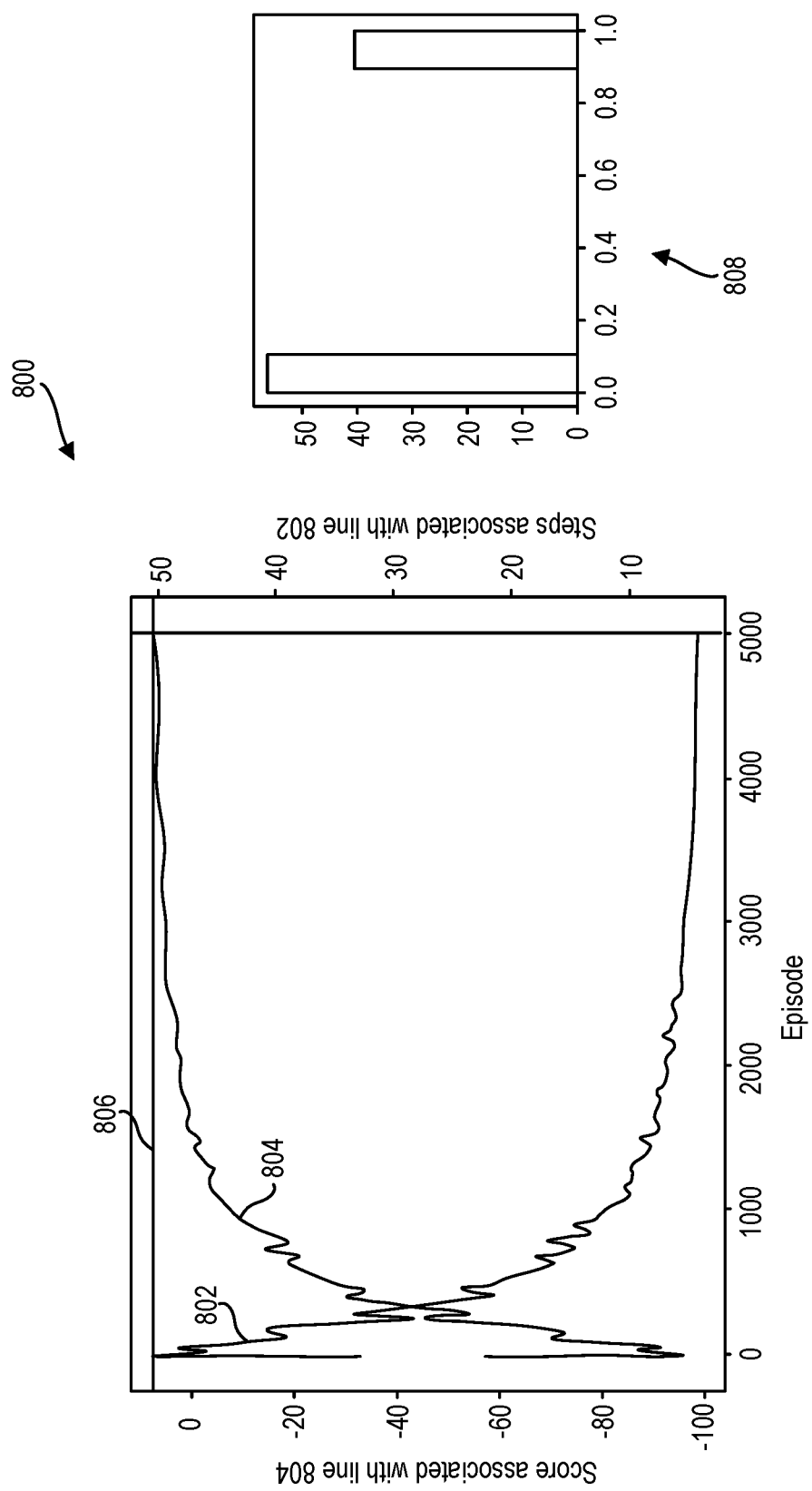
FIG. 8 is a graph, in accordance with one approach of the present invention.

FIG. 8 depicts a graph 800, in accordance with one approach. As an option, the present graph 800 may be implemented in conjunction with features from any other approach listed herein, such as those described with reference to the other FIGS. Of course, however, such graph 800 and others presented herein may be used in various applications and/or in permutations which may or may not be specifically described in the illustrative approaches listed herein. Further, the graph 800 presented herein may be used in any desired environment.

The graph 800 illustrates a running average of one hundred previous scores and steps performed using an HRL agent to identify API vulnerabilities of a predetermined API. For example, this identification is performed by generating and issuing an API call to the predetermined API. An assumption may be made that, issuing different API calls over a plurality of iterations run to generate the data of the graph 700 simulates a three-stage reinforce (MC) RL attacker exploiting BOLA and BFLA vulnerabilities of the predetermined API.

A first line 802 illustrates a number of steps, e.g., see "Steps associated with line 802" that are performed in order to perform the different iterations, e.g., see "Episode". It may be noted that as a result of implementing the techniques described herein for using HRL to identify API vulnerabilities, an accuracy of the HRL agent, e.g., see second line 804, quickly increases to a predetermined optimal policy score value 806, that is associated with a relatively high accuracy of identifying vulnerabilities in a given API, e.g., BOLA and BFLA vulnerabilities in the current approach, in a relatively early stage of the iterations. These efficiencies are also illustrated in a distribution 808 of the one hundred episodes. As a result of identifying these vulnerabilities, the vulnerabilities may be ensured to be mitigated before the predetermined API is deployed in a use case environment.

Figure 9:
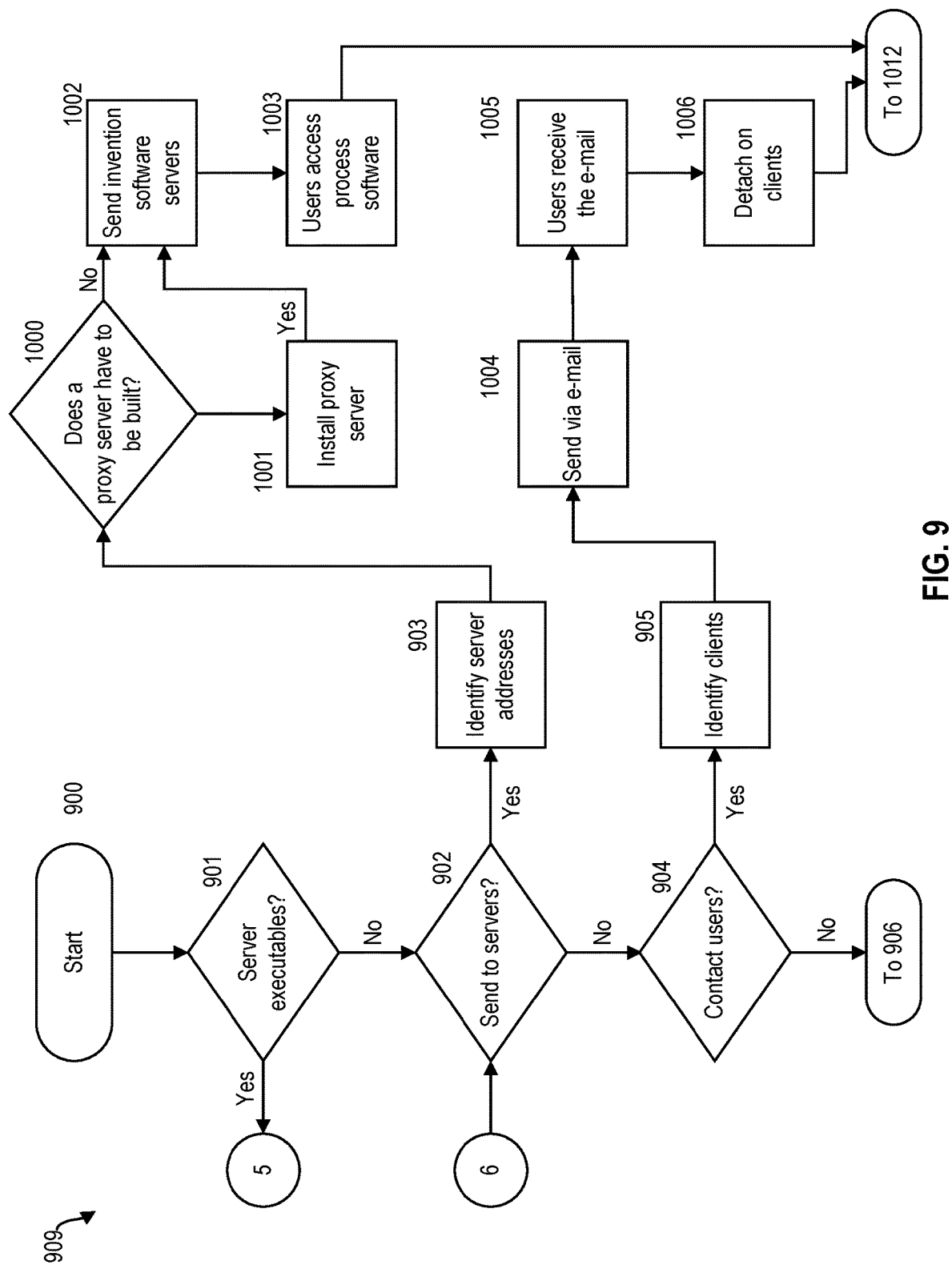
FIG. 9 is a flowchart of a method, in accordance with one approach of the present invention.
Figure 9:
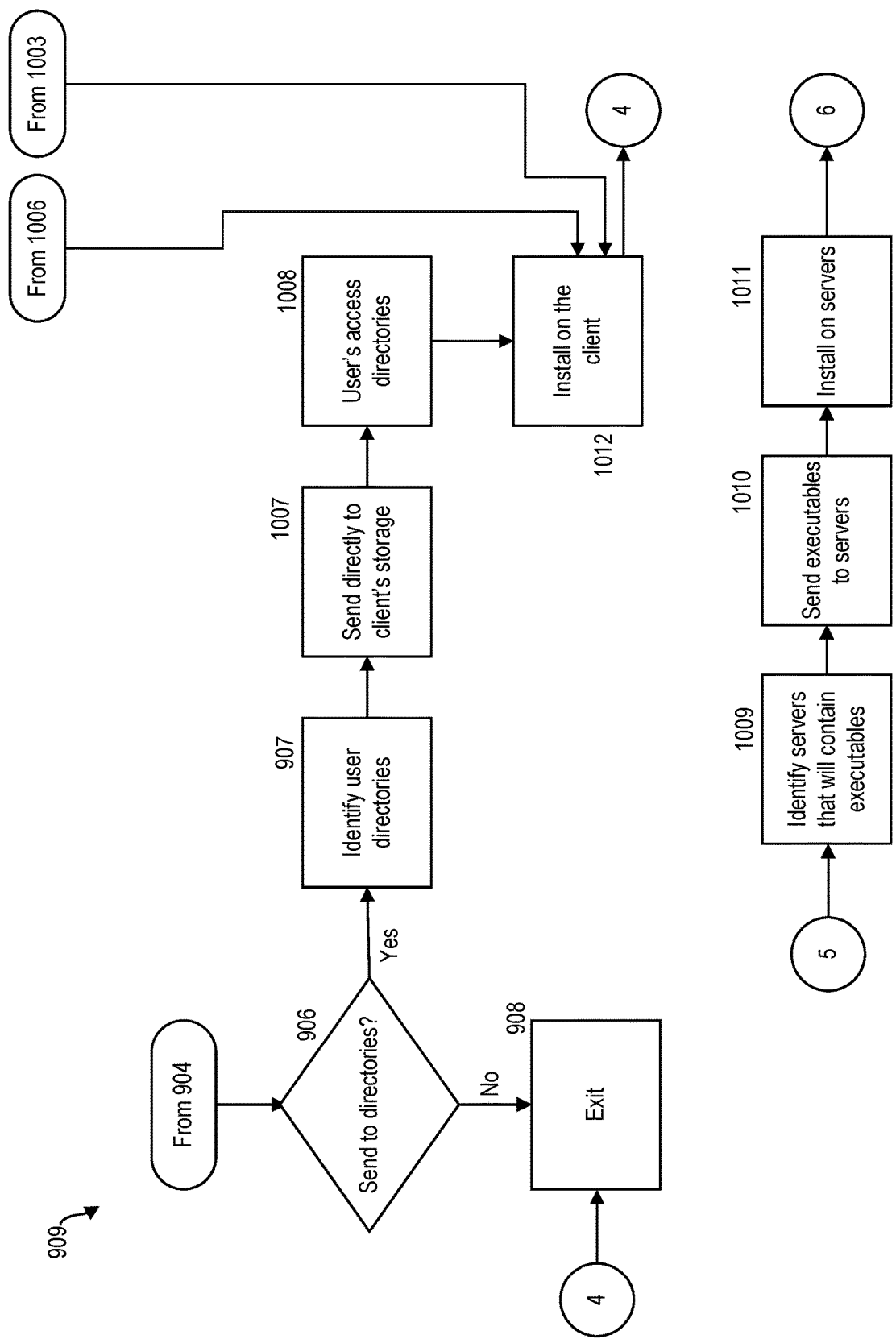

Now referring to FIG. 9, a flowchart of a method 909 is shown according to one embodiment. The method 909 may be performed in accordance with the present invention in any of the environments depicted in FIGS. 1-9, among others, in various embodiments. Of course, more or fewer operations than those specifically described in FIG. 9 may be included in method 909, as would be understood by one of skill in the art upon reading the present descriptions.

Each of the steps of the method 909 may be performed by any suitable component of the operating environment. For example, in various embodiments, the method 909 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 909. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for using HRL to identify API vulnerabilities may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 900 begins the deployment of the process software. An initial step is to determine if there are any programs that will reside on a server or servers when the process software is executed (901). If this is the case, then the servers that will contain the executables are identified (1009). The process software for the server or servers is transferred directly to the servers' storage via FTP or some other protocol or by copying though the use of a shared file system (1010). The process software is then installed on the servers (1011).

Next, a determination is made on whether the process software is to be deployed by having users access the process software on a server or servers (902). If the users are to access the process software on servers, then the server addresses that will store the process software are identified (903).

A determination is made if a proxy server is to be built (1000) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (1001). The process software is sent to the (one or more) servers either via a protocol such as FTP, or it is copied directly from the source files to the server files via file sharing (1002). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (1003). Another embodiment is to have the servers automatically copy the process software to each client and then run the installation program for the process software at each client computer. The user executes the program that installs the process software on his client computer (1012) and then exits the process (908).

In step 904 a determination is made whether the process software is to be deployed by sending the process software to users via e-mail. The set of users where the process software will be deployed are identified together with the addresses of the user client computers (905). The process software is sent via e-mail (1004) to each of the users' client computers. The users then receive the e-mail (1005) and then detach the process software from the e-mail to a directory on their client computers (1006). The user executes the program that installs the process software on his client computer (1012) and then exits the process (908).

Lastly, a determination is made on whether the process software will be sent directly to user directories on their client computers (906). If so, the user directories are identified (907). The process software is transferred directly to the user's client computer directory (1007). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (1008). The user executes the program that installs the process software on his client computer (1012) and then exits the process (908).

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
causing a predetermined hierarchical reinforcement learning (HRL) agent to perform, in a controlled environment, execution of a first potentially malicious API call against a predetermined API, wherein performing execution of the first potentially malicious API call against the predetermined API includes:
causing a first sub-agent of a first stage of an architecture of the HRL agent to make a first selection for defining a first portion of a first API call, and
causing a second sub-agent of a second stage of the architecture of the HRL agent to make a second selection for defining a second portion of the first API call, and issuing the first API call to the predetermined API; and
providing first reward-based feedback to the first sub-agent and the second sub-agent.

2. The computer-implemented method of claim 1, wherein the first stage of the architecture of the HRL agent includes a plurality of sub-agents, wherein the first portion of the first API call defines a selected method for a first micro-service to call in.

3. The computer-implemented method of claim 2, wherein the second stage of the architecture of the HRL agent includes a plurality of sub-agents, wherein the second portion of the first API call defines a selected parameter to call for the selected method.

4. The computer-implemented method of claim 3, wherein performing execution of the first potentially malicious API call against the predetermined API includes: causing a third sub-agent of a third stage of the architecture of the HRL agent to make a third selection for defining a third portion of the first API call, wherein the third stage of the architecture of the HRL agent includes a plurality of sub-agents, wherein the third portion of the first API call defines the first micro-service from a plurality of potential micro-services.

5. The computer-implemented method of claim 3, the selected parameter is selected from the group consisting of: video-ids, tokens, user-ids, and vehicle-ids.

6. The computer-implemented method of claim 3, wherein each of the sub-agents of the second stage of the architecture of the HRL agent is configured to define a single parameter from a plurality of different parameters.

7. The computer-implemented method of claim 3, wherein the second sub-agent of the second stage of the architecture of the HRL agent is configured to define more than one parameter from a plurality of different parameters.

8. The computer-implemented method of claim 1, comprising: causing the predetermined HRL agent to simulate, in the controlled environment, execution of a plurality of potentially malicious API calls against the predetermined API, wherein the execution of the first potentially malicious API call against the predetermined API includes Monte-Carlo simulations.

9. A computer program product, the computer program product comprising a computer readable storage medium having program instructions embodied therewith, the program instructions are readable and/or executable by a computer to cause the computer to:
cause a predetermined hierarchical reinforcement learning (HRL) agent to perform, in a controlled environment, execution of a first potentially malicious API call against a predetermined API, wherein performing execution of the first potentially malicious API call against the predetermined API includes:
causing a first sub-agent of a first stage of an architecture of the HRL agent to make a first selection for defining a first portion of a first API call, and
causing a second sub-agent of a second stage of the architecture of the HRL agent to make a second selection for defining a second portion of the first API call, and
issuing the first API call to the predetermined API; and
provide first reward-based feedback to the first sub-agent and the second sub-agent.

10. The computer program product of claim 9, wherein the first stage of the architecture of the HRL agent includes a plurality of sub-agents, wherein the first portion of the first API call defines a selected method for a first micro-service to call in.

11. The computer program product of claim 10, wherein the second stage of the architecture of the HRL agent includes a plurality of sub-agents, wherein the second portion of the first API call defines a selected parameter to call for the selected method.

12. The computer program product of claim 11, wherein performing execution of the first potentially malicious API call against the predetermined API includes: causing a third sub-agent of a third stage of the architecture of the HRL agent to make a third selection for defining a third portion of the first API call, wherein the third stage of the architecture of the HRL agent includes a plurality of sub-agents, wherein the third portion of the first API call defines the first micro-service from a plurality of potential micro-services.

13. The computer program product of claim 11, wherein the selected parameter is selected from the group consisting of: video-ids, tokens, user-ids, and vehicle-ids.

14. The computer program product of claim 11, wherein each of the sub-agents of the second stage of the architecture of the HRL agent is configured to define a single parameter from a plurality of different parameters.

15. The computer program product of claim 11, wherein the second sub-agent of the second stage of the architecture of the HRL agent is configured to define more than one parameter from a plurality of different parameters.

16. The computer program product of claim 9, the program instructions are readable and/or executable by the computer to cause the computer to: cause the predetermined HRL agent to simulate, in the controlled environment, execution of a plurality of potentially malicious API calls against the predetermined API, wherein the execution of the first potentially malicious API call against the predetermined API includes Monte-Carlo simulations.

17. A system, comprising:
a processor; and
logic integrated with the processor, executable by the processor, or integrated with and executable by the processor, the logic being configured to:
cause a predetermined hierarchical reinforcement learning (HRL) agent to perform, in a controlled environment, execution of a first potentially malicious API call against a predetermined API, wherein performing execution of the first potentially malicious API call against the predetermined API includes:
causing a first sub-agent of a first stage of an architecture of the HRL agent to make a first selection for defining a first portion of a first API call, and
causing a second sub-agent of a second stage of the architecture of the HRL agent to make a second selection for defining a second portion of the first API call, and
issuing the first API call to the predetermined API; and
provide first reward-based feedback to the first sub-agent and the second sub-agent.

18. The system of claim 17, wherein the first stage of the architecture of the HRL agent includes a plurality of sub-agents, wherein the first portion of the first API call defines a selected method for a first micro-service to call in.

19. The system of claim 18, wherein the second stage of the architecture of the HRL agent includes a plurality of sub-agents, wherein the second portion of the first API call defines a selected parameter to call for the selected method.

20. The system of claim 19, wherein performing execution of the first potentially malicious API call against the predetermined API includes: causing a third sub-agent of a third stage of the architecture of the HRL agent to make a third selection for defining a third portion of the first API call, wherein the third stage of the architecture of the HRL agent includes a plurality of sub-agents, wherein the third portion of the first API call defines the first micro-service from a plurality of potential micro-services.

* * * * *